(12) United States Patent
Akiyama

(10) Patent No.: US 9,906,728 B2
(45) Date of Patent: Feb. 27, 2018

(54) IMAGING APPARATUS AND SUPPORT MECHANISM FOR MOVABLE MEMBER

(71) Applicant: RICOH IMAGING COMPANY, LTD., Tokyo (JP)

(72) Inventor: Kazuhiro Akiyama, Tokyo (JP)

(73) Assignee: RICOH IMAGING COMPANY, LTD., Tokyo (JP)

(*) Notice: Subject to any disclaimer, the term of this patent is extended or adjusted under 35 U.S.C. 154(b) by 0 days.

(21) Appl. No.: 15/262,286

(22) Filed: Sep. 12, 2016

(65) Prior Publication Data
US 2017/0078579 A1 Mar. 16, 2017

(30) Foreign Application Priority Data

Sep. 14, 2015 (JP) ................................ 2015-181120
Sep. 14, 2015 (JP) ................................ 2015-181121

(51) Int. Cl.
*H04N 5/232* (2006.01)
*H04N 5/225* (2006.01)
*G03B 17/02* (2006.01)

(52) U.S. Cl.
CPC ......... *H04N 5/23293* (2013.01); *G03B 17/02* (2013.01); *H04N 5/2252* (2013.01); *G03B 2217/002* (2013.01)

(58) Field of Classification Search
None
See application file for complete search history.

(56) References Cited

U.S. PATENT DOCUMENTS

| 2006/0238661 A1* | 10/2006 | Oh | F16M 11/18 |
| | | | 348/825 |
| 2013/0093946 A1* | 4/2013 | Nakagawa | H04N 5/2252 |
| | | | 348/374 |
| 2016/0252798 A1* | 9/2016 | Igi | G03B 17/08 |
| | | | 348/375 |

FOREIGN PATENT DOCUMENTS

| JP | 2003-315891 | 11/2003 |
| JP | 2006-314042 | 11/2006 |
| JP | 2009-303104 | 12/2009 |
| JP | 2010-103921 | 5/2010 |

OTHER PUBLICATIONS

U.S. Appl. No. 15/263,858 to Kazuhiro Akiyama, filed Sep. 13, 2016.

* cited by examiner

*Primary Examiner* — James Hannett
(74) *Attorney, Agent, or Firm* — Greenblum & Bernstein, P.L.C.

(57) ABSTRACT

An imaging apparatus includes a body provided with an image sensor; a displayer configured to display an image obtained via the image sensor, the displayer being supported by the body to be movable relative to the body; a connecting member provided with first and second connecting portions; a first support portion provided on one of the body and the displayer, the first connecting portion of the connecting member being connected to the first support portion in a rotatable manner about a spherical center thereof relative to the one of the body and the displayer; and a second support portion provided on the other of the body and the displayer, the second connecting portion of the connecting member being connected to the second support portion in a rotatable manner about a spherical center thereof and in a linearly-movable manner relative to the other of the body and the displayer.

20 Claims, 20 Drawing Sheets

IMAGING APPARATUS AND SUPPORT MECHANISM FOR MOVABLE MEMBER

BACKGROUND OF THE INVENTION

1. Field of the Invention

The present invention relates to an imaging apparatus equipped with a movable display; the present invention also relates to a support mechanism for a movable member, such as a movable display.

2. Description of the Related Art

Imaging apparatuses such as digital still cameras and digital camcorders which are constructed to allow the orientation and the angle of a display (displayer) for displaying images (visual images) to be adjusted relative to a body of the imaging apparatus to enhance the convenience of photographing and handling of the imaging apparatus are known in the art. A hinge mechanism (so-called a variable angle mechanism) which supports the display in a manner to allow the display to rotate about one or more than one axis, and a link mechanism which supports the display by a plurality of links (arms) that are connected via pins are known as support mechanisms for the aforementioned movable (angle-adjustable) type of display. In addition, a support structure for the display like that shown in Japanese Unexamined Patent Publication No. 2009-303104 (Patent Literature 1) in which a concave curved surface and a convex curved surface that are in surface contact with each other to be slidable on each other are formed on a body of the imaging apparatus and the display side, respectively, to allow the display to slide along the concave curved surface and the convex curved surface is also known in the art.

The support mechanism using the conventional hinge mechanism or the conventional link mechanism is limited in flexibility in setting of the orientation of the display. When the hinge mechanism is used, sometimes the position of the display largely deviates with respect to a photographing optical axis upon the display being rotated about the axis (axes), which makes it difficult to control the composition. In close-up (macro) photography in particular, the distance between the display of the imaging apparatus and a photographic object is short, so that even a slight shake or a slight positional deviation of the user or the imaging apparatus exerts a great influence on the composition, which makes it difficult to control the composition by intuition if the deviation in position of the display with respect to a photographing optical axis is great, thus causing stress for the user.

The support mechanism using curved surfaces like that disclosed in Patent document 1 is higher in flexibility in setting of the orientation of the display than either of the aforementioned hinge mechanism and the aforementioned link mechanism. However, the projecting amount of the display from the body of the imaging apparatus in a direction normal to a photographing optical axis becomes great when the display is made to slide with respect to the body of the imaging apparatus; in addition, the concave curved surface becomes great in depth (in other words, the projecting amount of the convex curved surface becomes great) in order to secure a practical tilt angle of the display, which tends to cause an increase in thickness of the support mechanism in the direction along the photographing optical axis; these issues constitute the problems to be solved by the present invention.

Additionally, also in technical fields other than the field of imaging apparatuses, support mechanisms for a movable member which is adjustable in orientation and angle with respect to a main body have similar problems, so that there has been a demand to prevent an increase in size of the support mechanism while increasing the flexibility in setting the orientation and the angle of the movable member.

SUMMARY OF THE INVENTION

The present invention has been devised in view of the above described problems and provides an imaging apparatus having a movable display wherein the imaging apparatus has a high degree of flexibility in setting the orientation and the angle of the movable display, and can be made small in size. The present invention also provides a support mechanism for a movable member wherein the support mechanism has a high degree of flexibility in setting the orientation and the angle of the movable member and can be made small in size.

According to an aspect of the present invention, an imaging apparatus is provided, including a body provided with an image sensor; a displayer configured to display an image obtained via the image sensor, the displayer being supported by the body to be movable relative to the body; a connecting member provided with a first connecting portion and a second connecting portion; a first support portion provided on one of the body and the displayer, the first connecting portion of the connecting member being connected to the first support portion in a rotatable manner about a spherical center of the first connecting portion relative to the one of the body and the displayer; and a second support portion provided on the other of the body and the displayer, the second connecting portion of the connecting member being connected to the second support portion in a rotatable manner about a spherical center of the second connecting portion and in a linearly-movable manner relative to the other of the body and the displayer.

The position of the display portion relative to the body varies with high flexibility by rotation of the first connecting portion of the connecting member about the spherical center thereof relative to the first support portion and a combination of rotation of the second connecting portion of the connecting member about the spherical center thereof relative to the second support portion and linear movement of the second connecting portion of the connecting member relative to the second support portion.

It is desirable for the displayer to be positioned on a line extended from an optical axis of a light bundle incident on the image sensor. The connecting member, the first support portion and the second support portion are provided on portions of the body and the displayer which face each other in a direction of the extended line.

In this case, it is desirable for the second support portion to support the second connecting portion in a manner to allow the first connecting portion to move linearly in a plane substantially orthogonal to the optical axis.

It is desirable for the connecting member to include a rod-shaped portion formed between the first connecting portion and the second connecting portion. The first connecting portion of the connecting member includes a spherical body provided at one end of the rod-shaped portion. The second connecting portion of the connecting member includes a spherical body provided at another end of the rod-shaped portion. The second support portion includes a guide groove which is formed to extend in the linear movement direction, the second connecting portion being fitted into the guide groove in a manner to allow a spherical outer surface of the second connecting portion to slide on an inner surface of the guide groove. A projecting direction of the rod-shaped portion relative to the guide groove therefrom varies when the second connecting portion slides in the linear movement direction along the guide groove.

It is desirable for the guide groove to include a pair of facing walls which hold a spherical outer surface of the second connecting portion, and for a base portion which connects the pair of facing walls. The pair of facing walls are configured to resiliently deform while changing a distance therebetween. The second connecting portion is inserted into the guide groove with the distance made larger than that in a free state to thereby receive sliding resistance from the pair of facing walls.

It is desirable for the guide groove to include a retaining member which prevents the second connecting portion from being disengaged from the guide groove in an opposite direction from the base portion. An opening which allows the rod-shaped portion to be inserted into the guide groove through the opening is formed in the retaining member.

It is desirable for the first support portion to include a pair of concave surfaces which hold a spherical outer surface of the first connecting portion from opposite sides thereof in a manner to allow the first connecting portion to rotate about the spherical center thereof. A concave-surface support member which is resiliently deformable to allow a distance between the pair of concave surfaces that face each other to vary. The one of the body and the displayer, on which the first support portion is provided, includes a support member mount which supports the concave-surface support member while making the distance between the pair of concave surfaces smaller than that in a free state. A sliding resistance is applied between the first connecting portion and the pair of concave surfaces with the concave-surface support member installed in the support member mount.

In the case where the present invention is applied to the displayer which is substantially rectangular in outer shape, it is desirable for the displayer to have a substantially rectangular outer shape, wherein four the guide grooves are formed to extend in four directions which connect a center of the rectangular outer shape with four corners of the rectangular outer shape of the displayer, respectively. The second connecting portions of four the connecting members are inserted into the four guide grooves, respectively. The first connecting portions of the four of the connecting members are connected to four the first support portions, respectively.

It is desirable for the second connecting portions of the four connecting members to move in the four guide grooves from the four corners toward the center of the rectangular outer shape, respectively, when the displayer moves in a direction to increase a distance between the displayer and the body. The second connecting portions of the four connecting members move in the four guide grooves from the center of the rectangular outer shape toward the four corners, respectively, when the displayer moves in a direction to decrease the distance between the displayer and the body.

The support mechanism can be constructed as a two-stage angle variable type of movable-display support mechanism in which the displayer includes a first support stage which is connected to the body via the connecting member, and a second support portion configured to tilt in at least one direction relative to the first support stage via a tilt mechanism provided independently of the connecting member.

Whether the first support portion and the second support portion are to be provided on the body and the displayer or the displayer and the body, respectively, is optional. As an example, it is possible for the second support portion to be provided on the body, and for the first support portion is provided on the displayer.

In this case, it is desirable for the displayer to include a display screen, a base plate which supports the first support portion, and a support frame which supports the display screen. The body includes an accommodating portion, having a recessed shape, which can accommodate the displayer, the second support portion being provided in the accommodating portion. The base plate includes a cutout which allows the second support portion to enter therein when the displayer is accommodated in the accommodating portion.

It is desirable for the imaging apparatus to be further provided with a connector which is configured to electrically connect a body control circuit of the body to a displayer control circuit of the displayer. The connector is provided between the body and the displayer and has a length that allows the displayer to move relative to the body.

It is desirable for the imaging apparatus to be further provided with a liquidtight cover that covers at least a part of the connector.

In an embodiment, an imaging apparatus is provided, including a body provided with an image sensor; a displayer configured to display an image obtained via the image sensor, the displayer being supported by the body to be movable relative to the body; a connecting member provided with a first connecting portion and a second connecting portion; a first support portion provided on one of the body and the displayer, the first support portion connecting to the first connecting portion of the connecting member to be movable with respect to the first connecting portion; and a second support portion provided on the other of the body and the displayer, the second support portion connecting to the second connecting portion of the connecting member to be movable with respect to the second connecting portion. A connecting configuration of the first support portion for connecting with the first connecting portion and a connecting configuration of the second support portion for connecting with the second connecting portion are mutually different.

It is desirable for the displayer to be configured to tilt in a plurality of directions relative to the body.

The present invention can be widely applied to not only a support mechanism which movably supports a displayer of an imaging apparatus but also a support mechanism which supports a movable member of a different type of apparatus so that the movable member can move relative to a body of the apparatus. The detailed structure of such a movable member support mechanism can be achieved by the adoption of a structure similar to the structure of the support mechanism of the displayer of the above described imaging apparatus.

For instance, it is possible for the movable member to include a first support stage which is connected to the body via the connecting member, and a second support portion configured to tilt in at least one direction relative to the first support stage via a tilt mechanism provided independently of the connecting member.

In addition, the present invention can also be applied to a display capable of displaying images for a type of electronic apparatus which is not equipped with an imaging apparatus (e.g., an electronic apparatus that is not equipped with a camera).

In an embodiment, an imaging apparatus is provided, including a body provided with an image sensor, which receives an incident light bundle passing through an imaging optical system along an optical axis thereof; and a displayer configured to display an image obtained via the image sensor on a display screen, the displayer being supported by the body to be movable relative to the body. The displayer is provided with a first support stage at a position on an extension of the optical axis while being configured to tilt in a plurality of directions relative to the body, and a second support portion configured to tilt relative to the first support stage. The second support portion supports the display screen and a displayer control circuit. The imaging apparatus is further provided with a connector which is configured to electrically connect a body control circuit of the body to the displayer control circuit. The connector includes a first, deformable section provided between the body and the first support stage, the first deformable section having a length that allows the tilting of the first support stage in the plurality of directions; an intermediate supported section which is supported on the first support stage; and a second deformable section provided between the first support stage and the second support portion, the first deformable section having a length that allows the tilting of the second support portion.

It is desirable for the displayer to have a substantially rectangular outer profile, the imaging apparatus further comprising a tilt mechanism configured to connect the second support portion to the first support stage, so that the second support portion can be tilted relative to the first support stage about a shaft which extends along one side of four sides of the rectangular outer profile of the displayer. The first support stage includes an intermediate supporting portion configured to support the intermediate supported section of the connector from a central position within the outer profile of the displayer to the one side, at which the tilt mechanism is provided. The first deformable section of the connector is connected to an end of the intermediate supporting portion at the central position. The second deformable section of the connector is connected to the other end of the intermediate supporting portion at the one side, at which the tilt mechanism is provided.

It is desirable for the body to include an outer-to-inner communicably connected insertion through-hole which extends along the optical axis direction at a position facing the end of the intermediate supporting portion at the central position. The first deformable section of the connector extends from the body through the insertion through-hole.

It is desirable for the first support stage to include four support-stage connecting portions provided at positions surrounding the end of the intermediate supporting portion at the central position. The body includes four body connecting portions provided at positions surrounding the insertion through-hole. The imaging apparatus includes four connecting members, each of which are configured to connect with one of an associated first connecting portion and an associated body connecting portion to be rotatable thereat about a spherical center, and to connect with the other of the associated first connecting portion and the associated body connecting portion to be rotatable thereat about another spherical center while being linearly movable in a direction substantially orthogonal to the optical axis. The first support stage is supported on the body to be capable of being tilted in any direction relative to the body via the four connecting members.

It is desirable for the first support stage to include an accommodating recess on a side of the first support stage that faces the body, the accommodating recess extending approximately from the central position within the outer profile of the displayer to the one side, at which the tilt mechanism is provided. The first deformable section of the connector enters into the accommodating recess when the body and the first support stage closely approach each other in the optical axis direction.

It is desirable for the imaging apparatus to include a liquidtight cover configured to cover at least the first deformable section of the connector.

It is desirable for the imaging apparatus to include a liquidtight cover configured to cover the first deformable section of the connector. The end of the intermediate supporting portion at the central position includes a hole section, the hole section configured to support an end of the liquidtight cover in a press-fitted manner. Another end of the liquidtight cover seals up the periphery of the insertion through-hole.

In an embodiment, an electronic apparatus is provided, including a body; and a displayer including a display screen, the displayer being movably supported on the body. The displayer is provided with a first support stage which is configured to tilt in a plurality of directions relative to the body, and a second support portion configured to tilt relative to the first support stage. The second support portion supports the display screen and a displayer control circuit. The imaging apparatus is further provided with a connector which is configured to electrically connect a body control circuit of the body to the displayer control circuit. The connector includes a first deformable section provided between the body and the first support stage, the first deformable section having a length that allows the tilting of the first support stage in the plurality of directions; an intermediate supported section which is supported on the first support stage; and a second deformable section provided between the first support stage and the second support portion, the first deformable section having a length that allows the tilting of the second support portion.

According to the present invention, an imaging apparatus having a movable display can be achieved, wherein the imaging apparatus has a high flexibility in setting the orientation and the angle of the movable display and can be made small in size. In addition, a support mechanism for a movable member can be achieved, wherein the support mechanism has a high flexibility in setting the orientation and the angle of the movable member and can be made small in size.

The present disclosure relates to subject matter contained in Japanese Patent Application Nos. 2015-181120 and 2015-181121 (both filed on Sep. 14, 2015) which are expressly incorporated herein by reference in their entireties.

BRIEF DESCRIPTION OF THE DRAWINGS

The invention will be described below in detail with reference to the accompanying drawings, in which.

DESCRIPTION OF THE EMBODIMENT

Figure 1:
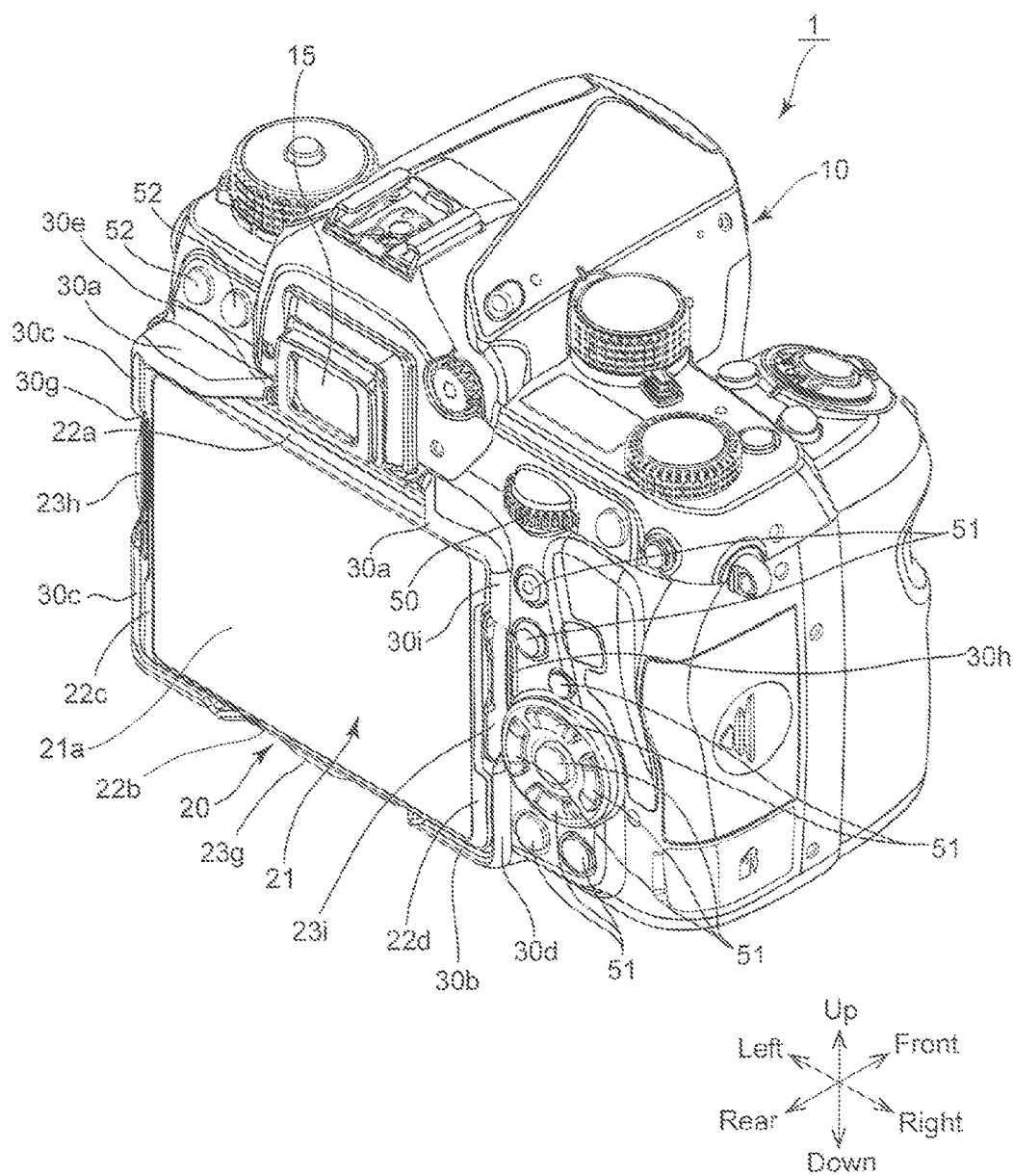
FIG. 1 is a rear perspective view of an embodiment of a lens-interchangeable SLR camera according to the present invention, illustrating the camera in its initial (normal) state, in which a movable monitor (movable displayer) that can be manually tilted is accommodated in a monitor accommodating portion formed in the back of the camera body.

FIGS. 1 through 11 show a camera body 11 of a camera (imaging apparatus) 1 according to the present invention. The camera 1 is an interchangeable (lens-interchangeable) SLR camera, to which an interchangeable lens (not shown) is detachably attached. The letter "O" shown in FIG. 11 designates an optical axis of the optical system of the interchangeable lens, through which a light bundle entering the camera body 10 passes. In the following descriptions, forward and rearward directions, leftward and rightward directions and upward and downward directions are determined with reference to the directions of the double-headed arrows shown in the drawings, and the forward direction corresponds to the direction toward the object side. The user is positioned behind the camera 1 in a normal shooting position, so that the upward and downward directions and the leftward and rightward directions are defined as those directions determined by looking from the user's side with the camera body 10 held substantially horizontally.

Figure 11:
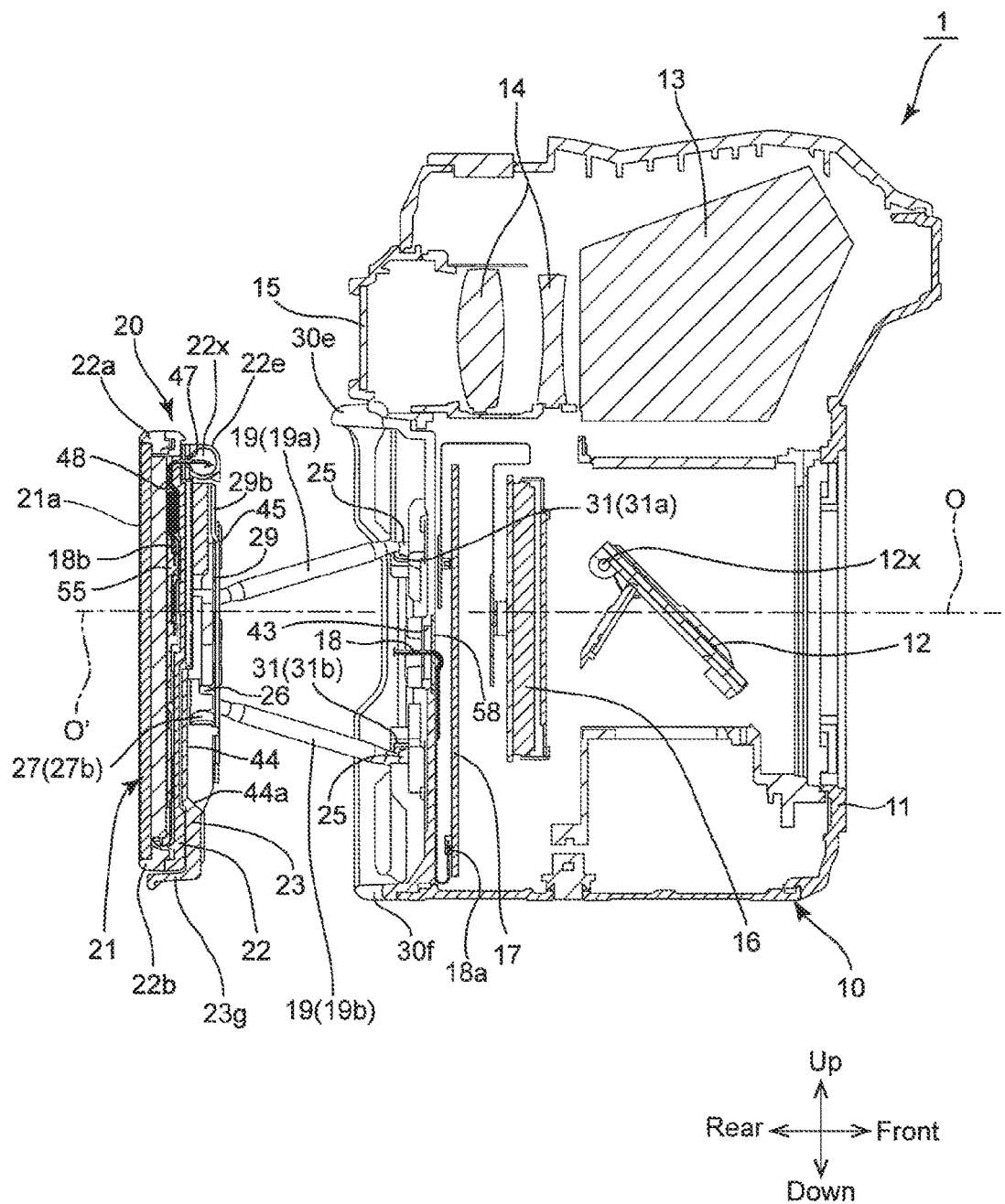
FIG. 11 is a longitudinal sectional view of the camera body and the movable monitor in the state shown in FIG. 7, taken along a plane in which the optical axis lies.

As shown in FIG. 11, the camera body 10 is provided on the front thereof with a lens mount 11 to which an interchangeable lens (not shown) is detachably attached. The camera body 10 is provided thereinside at a position behind the lens mount 11 with a quick-return mirror 12 that is rotatable about a mirror hinge 12x. The quick-return mirror 12 reciprocatively rotates (swings) by a mirror drive mechanism (not shown) between a mirror-down position (the position shown in FIG. 11), in which the quick-return mirror 12 is positioned in a photographing optical path in the camera body 10 to be inclined with respect to the photographing optical path, and a mirror-up position (retracted position), in which the quick-return mirror 12 is retracted upward from the photographing optical path.

When the quick-return mirror 12 is in the mirror-down position, object-emanated light which is passed through the photographing lens system of the interchangeable lens mounted to the lens mount 11 is reflected upward by the quick-return mirror 12 to travel toward a viewfinder optical system provided in the camera body 1. As shown in FIG. 11, this viewfinder optical system is provided with a pentagonal prism 13 which is positioned above the quick-return mirror 12, an eyepiece lens system 14 which is positioned behind the pentagonal prism 13, and an eyepiece window 15 which is positioned behind the eyepiece lens system 14. When the quick-return mirror 12 is in the mirror-down position, an object image can be optically observed through the eyepiece window 15. The camera body 10 is further provided therein, behind the quick-return mirror 12, with an image sensor (image pickup device) 16. When the quick-return mirror 12 rotates to the mirror-up position from the mirror-down position, the object-emanated light which enters the camera body 10 along the optical axis O can be received by the image sensor 16. The camera body 10 is provided between the quick-return mirror 12 and the image sensor 16 with a shutter (focal-plane shutter) (not shown in the drawings), and opening the shutter allows the object-emanated light to reach the light receiving surface of the image sensor 16. The object-emanated light received by the image sensor 16 is photoelectrically converted into an electrical signal to be converted into electronic image data by an image generating circuit. The camera body 10 is provided therein with a body-side circuit board (body control circuit) 17 which incorporates this image generating circuit.

The camera body 10 is provided, on the back thereof on the right-hand side of the eyepiece window 15, with a control dial 50. The camera body 10 is provided, on the back thereof below the control dial 50, with a plurality of control buttons 51; and the camera body 10 is further provided, on the back thereof on the left-hand side of the eyepiece window 15, with a plurality of control buttons 52. The control dial 50 is manually rotatable about a shaft (not shown) extending in the upward/downward direction, while each control button 51 and each control button 52 are push-buttons that operate by being manually depressed. Various settings on the camera 1 and capabilities thereof can be selectively performed using the control dial 50 and the control buttons 51 and 52. Such settings and capabilities are well-known, and thus the descriptions thereof are omitted in the following descriptions; however, as an example, aperture values and shutter speeds can be selectively set by rotating the control dial 50. The camera body 10 is further provided with other dials and buttons, e.g., various control dials and buttons provided on top of the camera body 10, etc.; however, the descriptions thereof are also omitted in the following descriptions.

The camera 1 is further provided on the back of the camera body 10 with a movable monitor (displayer/movable member) 20. The movable monitor 20 is positioned below the eyepiece window 15 and the plurality of control buttons 52 and on the left-hand side of the plurality of the control buttons 51. The control dial 50 is positioned obliquely above and to the right of the movable monitor 20. The movable monitor 20 is provided with a display 21 such as an LCD (liquid crystal display). The movable monitor 20 is positioned on an extension line of the optical axis O; more specifically, when the movable monitor 20 is in an initial position that is shown in FIG. 1, the center of the outer shape of the movable monitor 20 is substantially positioned on an imaginary line O' (see FIGS. 11, 20 and 21) extended rearward from the optical axis O. The body-side circuit board 17 and a monitor circuit board (displayer control circuit) 55 (see FIGS. 11, 20 and 21) provided inside the movable monitor 20 are connected via a flexible board (flexible PCB/connector) 18 (see FIGS. 20 and 21). Signal communications are performed between the camera body 10 and the movable monitor 20 via the flexible board 18, which makes it possible to visually indicate object images on the display 21 that are based on image data obtained via the image sensor 16 and various information other than images. The flexible board 18 is not shown in FIGS. 2, 4, 7, 9 and 12, and the flexible board 18 is only partially shown in FIG. 11. The movable monitor 20 is supported by the camera body 10 to be movable relative to the camera body 10, thereby allowing the orientation and the position of the display 21 to change. The support mechanism for the movable monitor 20 and operations thereof will be discussed hereinafter. Directions relating to the movable monitor 20 in the following descriptions are those noted when the movable monitor 20 is in the initial position that is shown in FIG. 1 (i.e., in a state where the movable monitor 20 is not either tilted or pulled out with respect to the camera body 10).

The display 21 is fixedly supported on a support frame (second support stage) 22. The display 21 has a display screen (display surface) 21a in the shape of a substantially rectangle which faces the user (leftward with respect to FIG. 11). The support frame 22 is provided with an upper side portion 22a, a lower side portion 22b, a left side portion 22c and a right side portion 22d which surround the four sides of the rectangular display 21. The display 21 has a rectangular shape elongated in the leftward and rightward directions, and the upper side portion 22a and the lower side portion 22b constitute a pair of long sides of the support frame 22, and the left side portion 22c and the right side portion 22d constitute a pair of short sides of the support frame 22 to correspond to the shape of the display 21.

Figure 5:
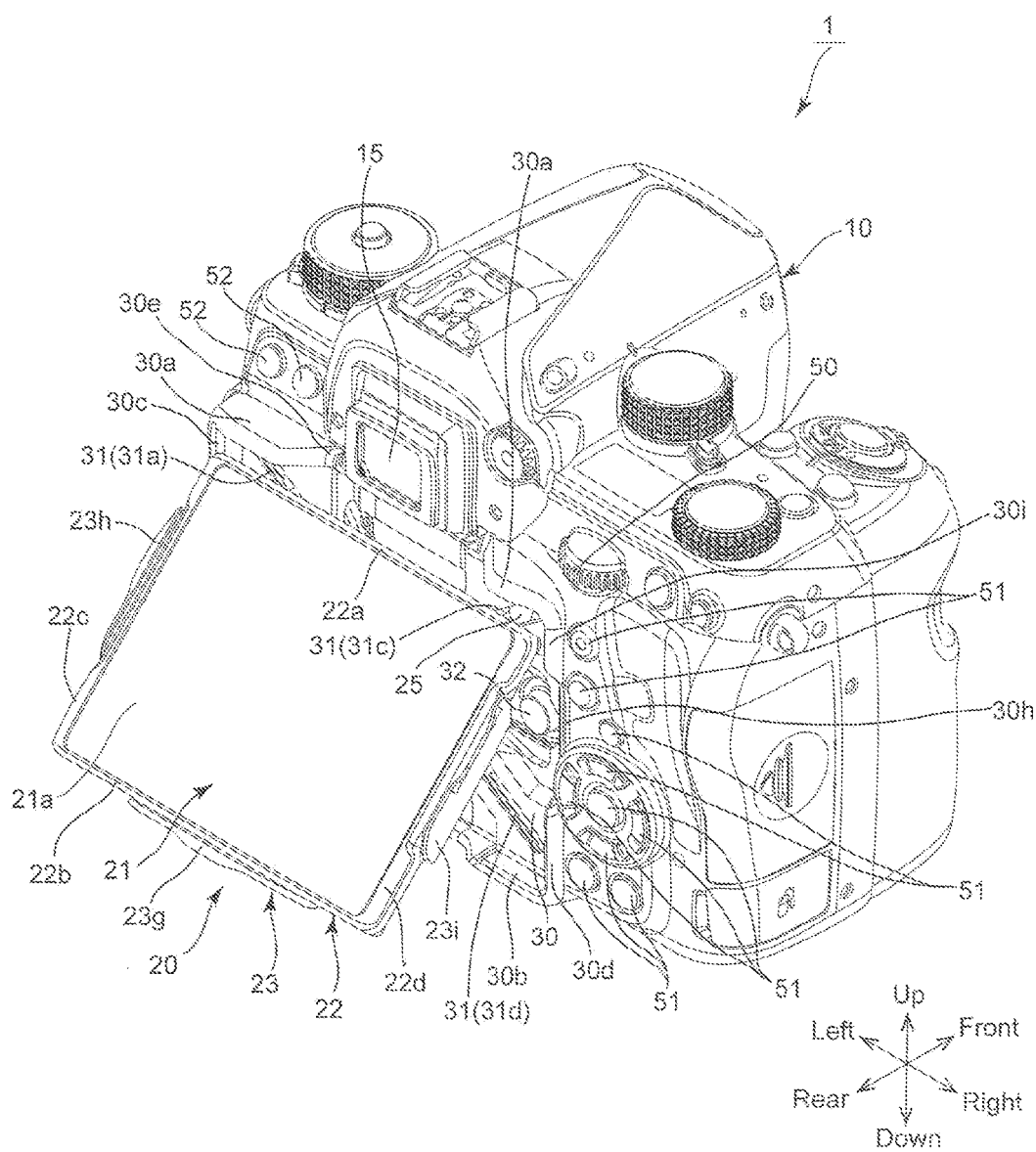
FIG. 5 is a rear perspective view of the SLR camera with the movable monitor tilted upward.
Figure 6:
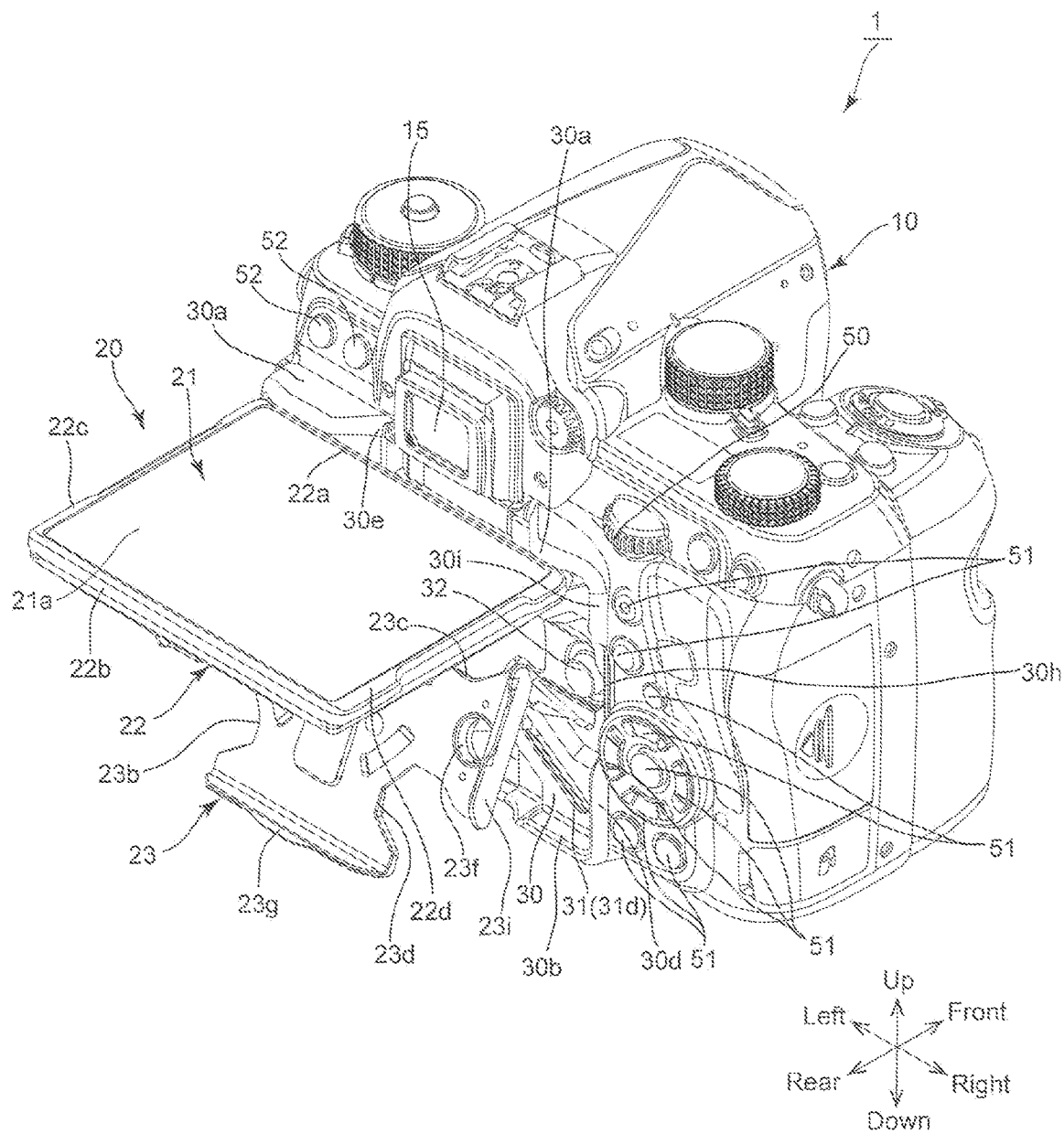
FIG. 6 is a rear perspective view of the SLR camera with the movable monitor tilted further upward.
Figure 7:
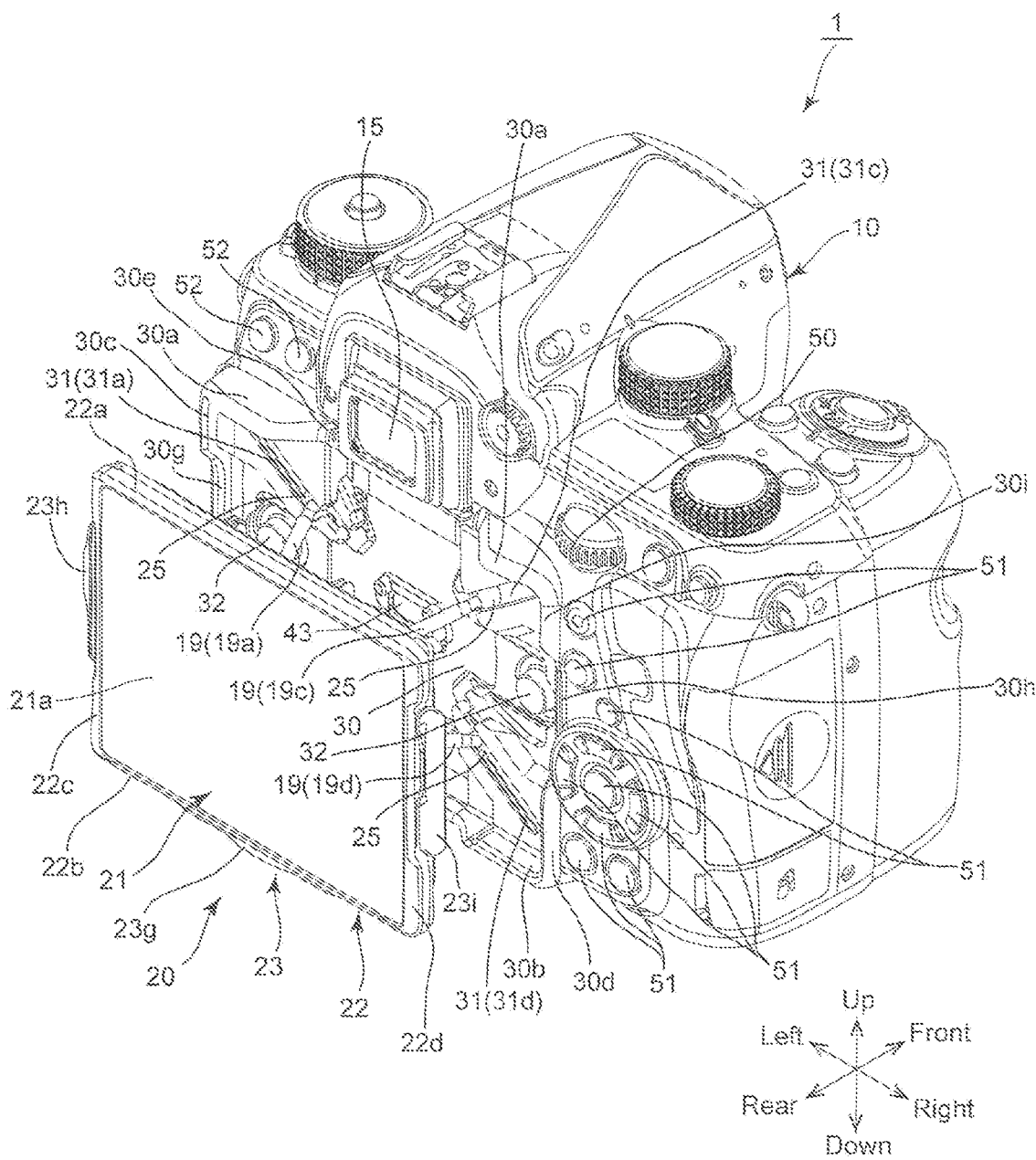
FIG. 7 is a rear perspective view of the SLR camera with the movable monitor pulled out rearwardly.
Figure 13:
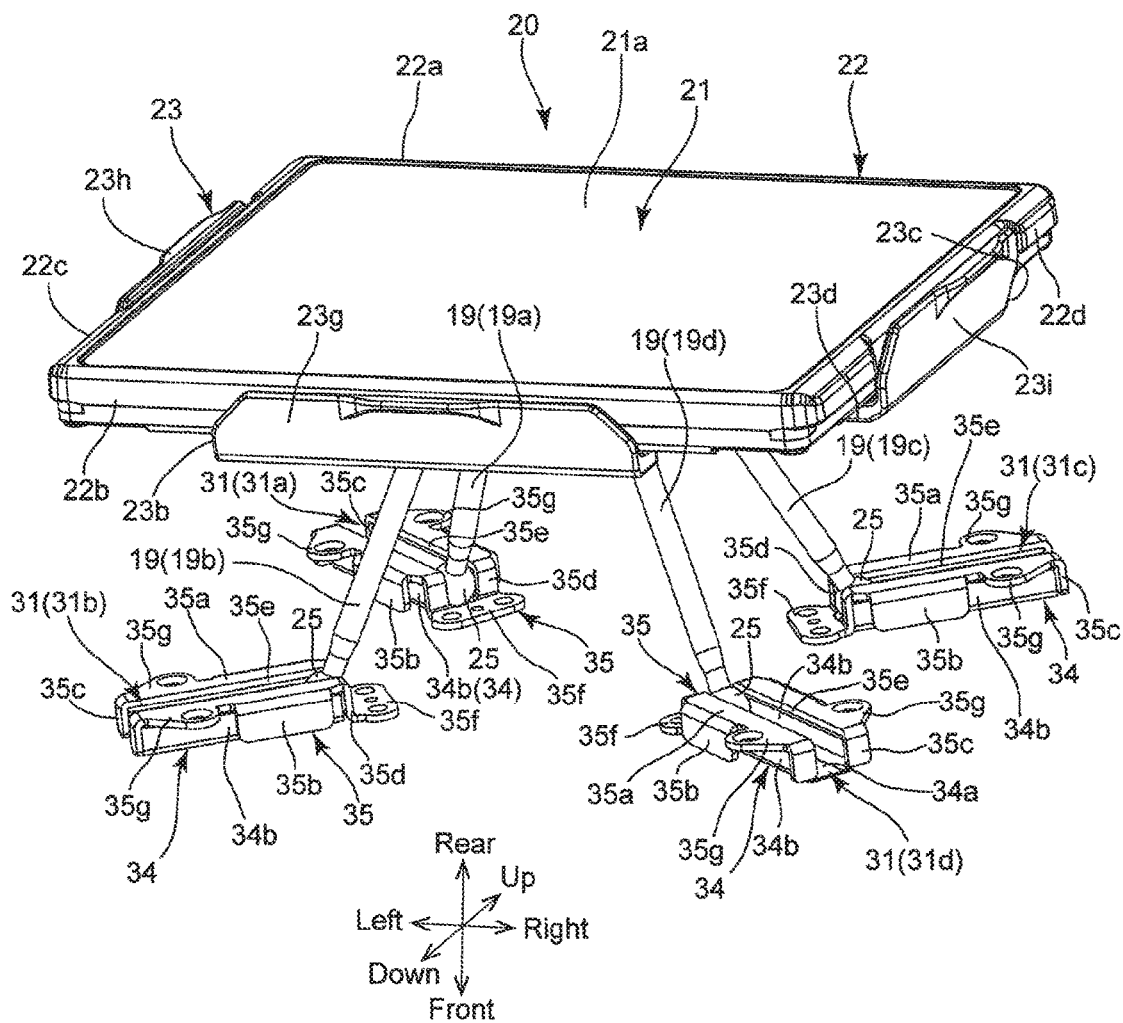
FIG. 13 is a view similar to that of FIG. 12, illustrating the elements shown in FIG. 12 from which the camera body is removed for clarity.
Figure 14:
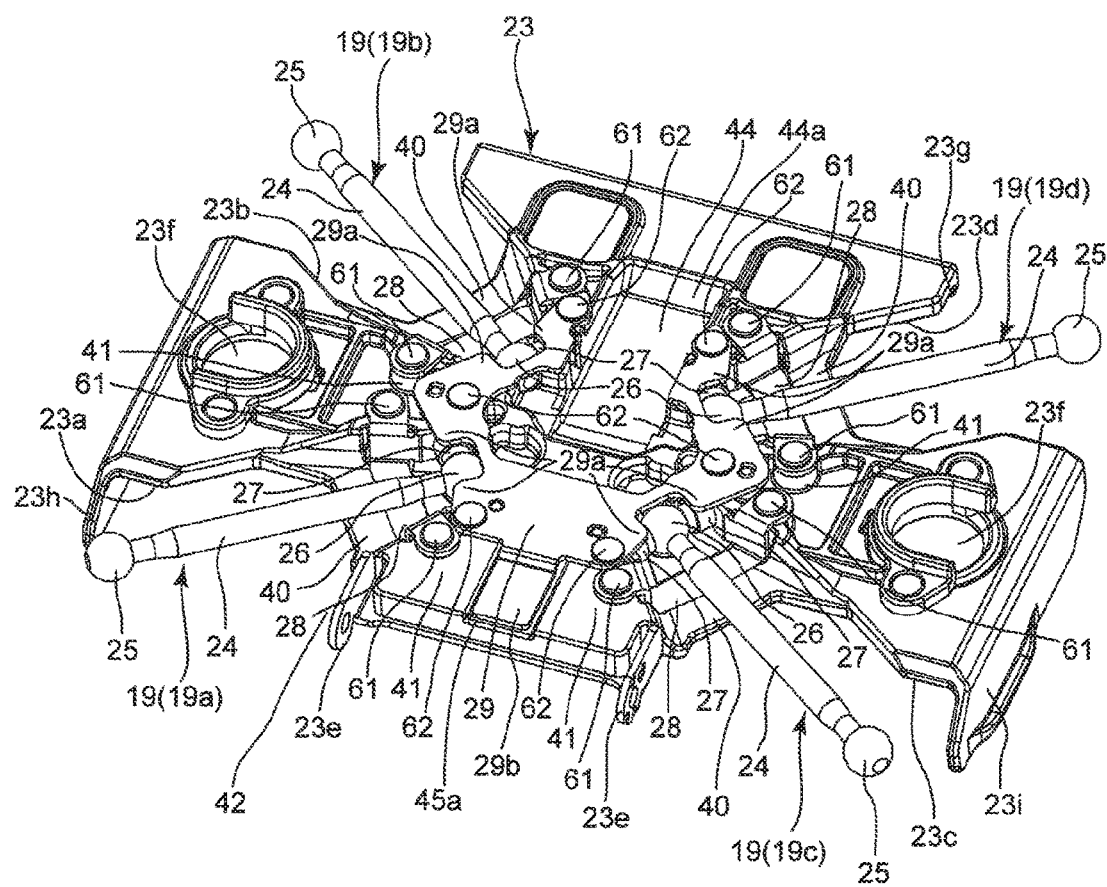
FIG. 14 is a perspective view of a portion of the support mechanism for the movable monitor in the state shown in FIG. 1, viewed obliquely from the camera body side.
Figure 14:
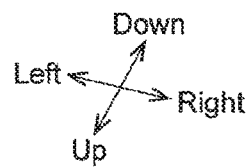
Figure 15:
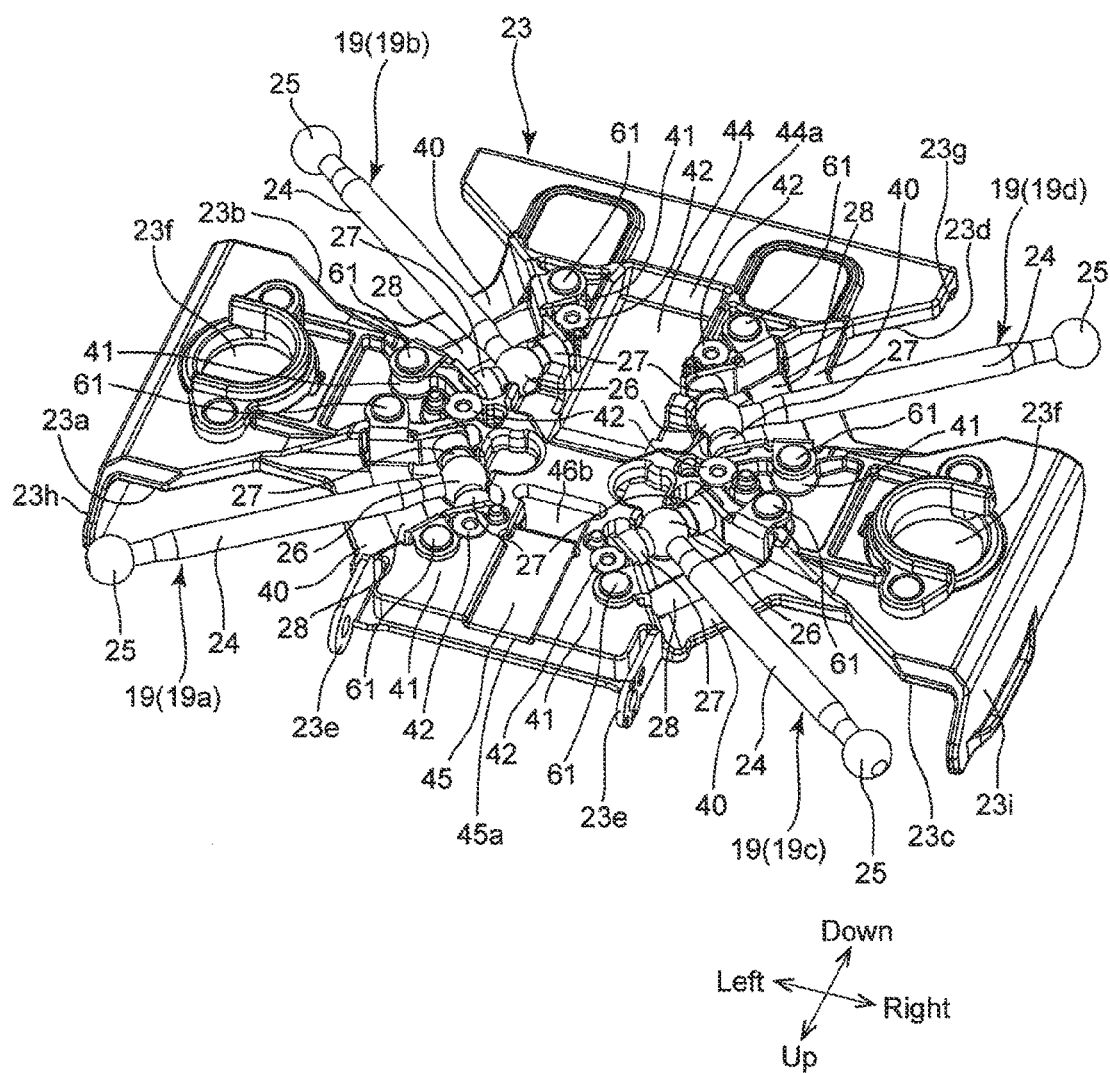
FIG. 15 is a view similar to that of FIG. 14, illustrating the elements of the support mechanism shown in FIG. 14 from which a presser plate is removed for clarity.
Figure 20:
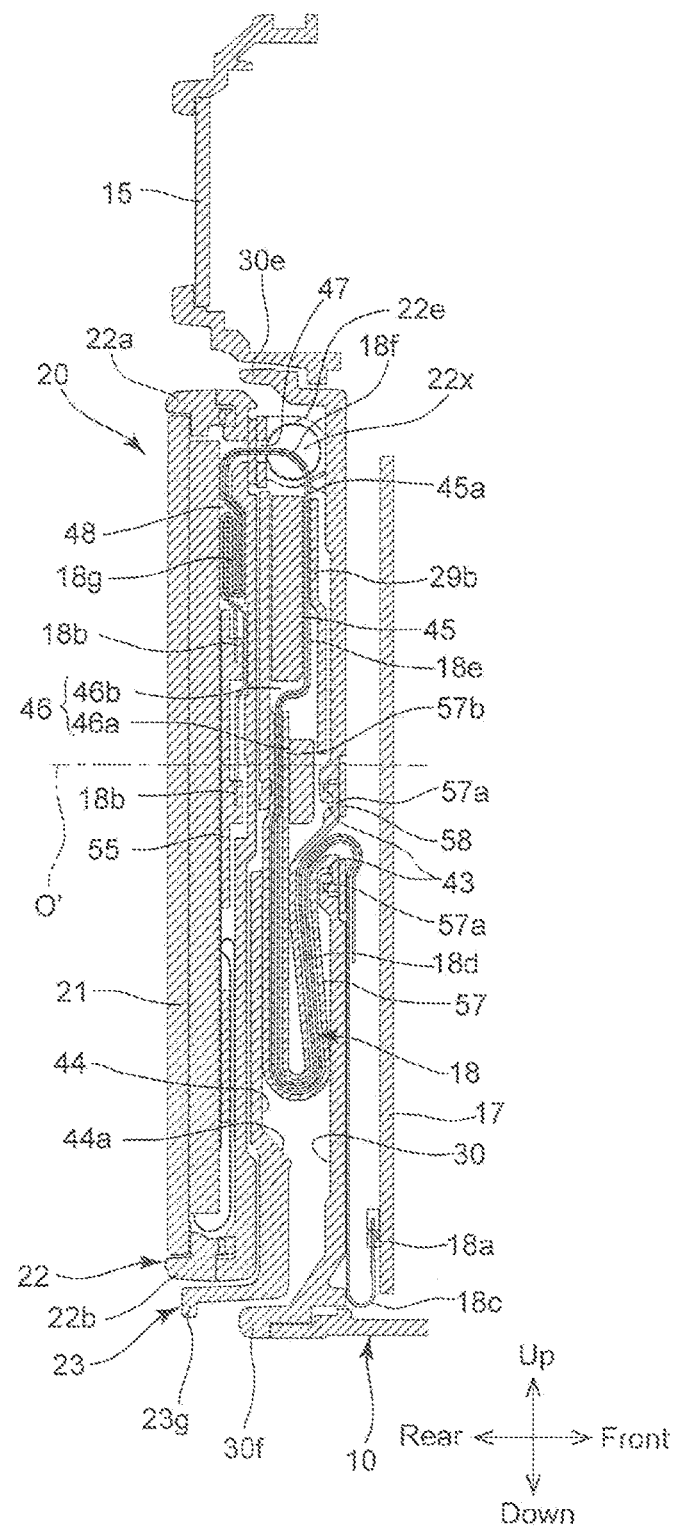
FIG. 20 is a longitudinal sectional view of the movable monitor and the support mechanism therefor in the state shown in FIG. 1, taken along a plane in which the aforementioned axis (imaginary line) lies.
Figure 21:
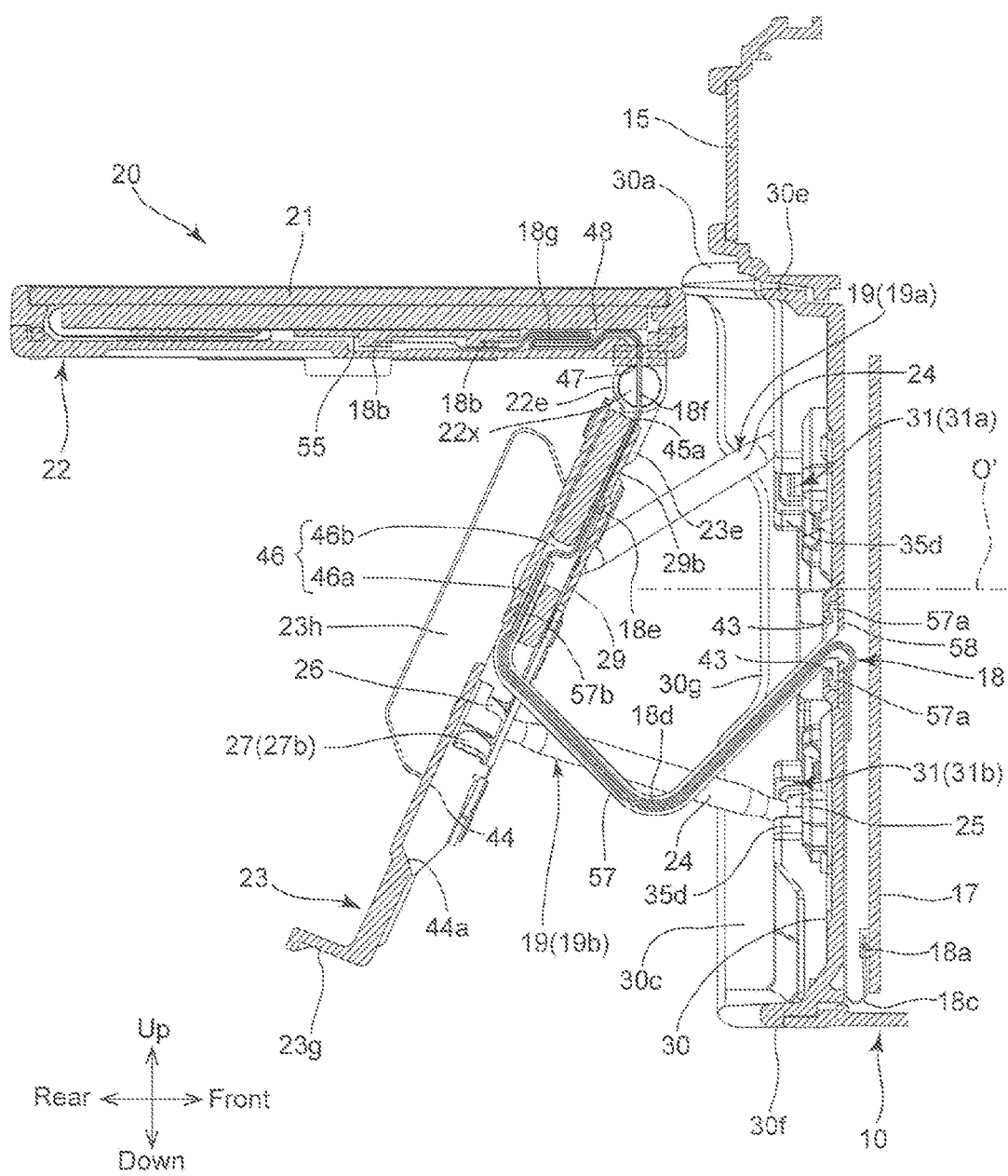
FIG. 21 is a longitudinal sectional view of the movable monitor and the support mechanism therefor in the state shown in FIG. 6, taken along a plane in which the aforementioned axis (imaginary line) lies.

The support frame 22 is supported by a base plate (first support stage portion/base cradle) 23 made of metal. As shown in FIGS. 14 and 15, the base plate 23 is provided with four cutouts 23a, 23b, 23c and 23d which cut out four corners of the base plate 23 from a basic rectangular shape corresponding to the rectangular outer shapes of the display 21 and the support frame 22. The base plate 23 is provided, on the upper side portion thereof that is positioned between the cutouts 23a and 23c, with a pair of shaft support lugs (elements of a tilt mechanism) 23e, and the support frame 22 is provided with a pair of shaft support portions (elements of the tilt mechanism) 22e which are in contact with sides of the pair of shaft support lugs 23e, respectively (see FIGS. 2, 4, 9 and 11). Each shaft support lug 23e and the associated shaft support portion 22e are connected to be rotatable relative to each other via a pin (an element of the tilt mechanism) 22x (see FIGS. 2, 4, 9, 11, 20 and 21), the axis of which extends in the leftward/rightward direction, which allows the support frame 22 to rotate about the pins 22x relative to the base plate 23. The (left and right) pins 22x are coaxial with each other. The orientation of the support frame 22 can be changed in the upward and downward directions by rotating about the pins 22x (FIGS. 5, 6 and 21). A click washer 38 (an element of the tilt mechanism) 38 is fixed to each shaft support lug 23e on the opposite side thereof from the side which is in contact with the associated shaft support portion 22e (see FIGS. 2, 4 and 9). The two click washers 38 are disk members each provided, at two different positions on the outer edge thereof, with two recesses. Engagement of these two recesses of each click washer 38 with protrusions (not shown) formed on the associated shaft support portion 22e causes the support frame 22 to be slightly engaged with the base plate 23 and stop (with an audible click) when the support frame 22 is manually rotated relative to the base plate 23 about the pins 22x. The two engaging positions (click-stop positions) that are defined by the click washer 38 are the following two positions: an integral position (shown in FIGS. 1 through 5, 7 through 13 and 20), in which the support frame 22 and the base plate 23 integrally overlay each other, and a raised position (shown in FIGS. 6 and 21), in which the support frame 22 is opened upward at a predetermined angle relative to the base plate 23.

The base plate 23 is provided, at two different positions in the leftward and rightward directions, with two through-holes 23f (see FIGS. 6, 14 and 15). The base plate 23 is further provided on the outer edge thereof with flanges 23g, 23h and 23i which are shaped to be capable of being fitted onto the lower side portion 22b, the left side portion 22c and the right side portion 22d of the support frame 22, respectively. The flange 23g is positioned between the cutouts 23b and 23d, the flange 23h is positioned between the cutouts 23a and 23b, and the flange 23i is positioned between the cutouts 23c and 23d.

Figure 12:
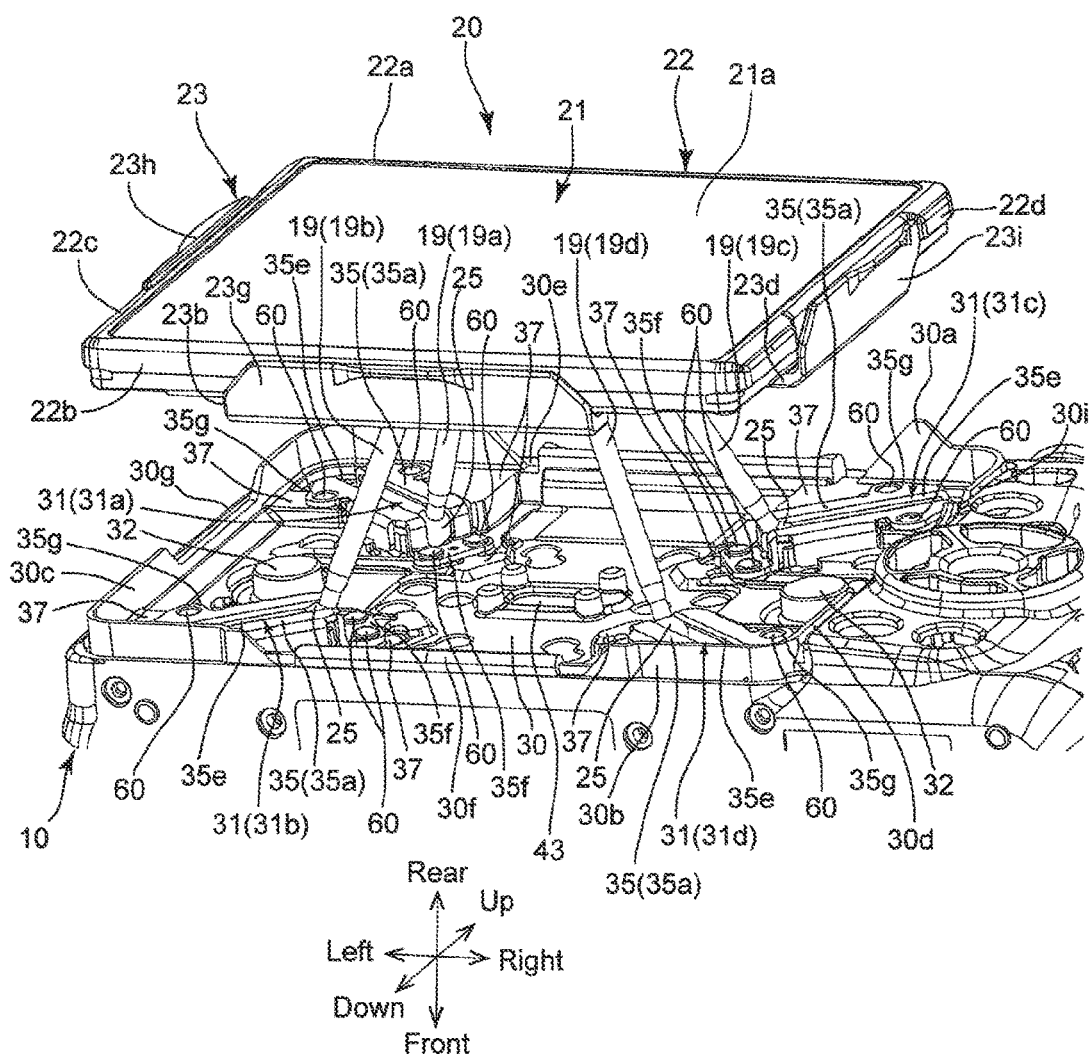
FIG. 12 is a perspective view of the movable monitor and a portion of the camera body which includes the monitor accommodating portion in the state shown in FIG. 7, viewed obliquely from the bottom of the camera body.

The camera body 10 is provided on the back thereof with a monitor accommodating portion 30 which can accommodate the movable monitor 20. The monitor accommodating portion 30 is formed in the shape of a rectangular recess corresponding to the substantially rectangular outer shape of the movable monitor 20 (i.e., allowing the movable monitor 20 to be fitted into the monitor accommodating portion 30) and is surrounded by an upper edge wall 30a, a lower edge wall 30b, a left edge wall 30c and a right edge wall 30d which are formed on the back of the camera body 10 to project rearward like flanges. Four guide grooves (second support portions/four body connecting portions) 31 are formed at the bottom of the monitor accommodating portion 30, into four elongated grooves which extend in four radial directions along the diagonal lines of the substantially rectangular monitor accommodating portion 30. More specifically, an upper left guide groove 31a, a lower left guide groove 31b, an upper right guide groove 31c and a lower right guide groove 31d are formed as the four guide grooves 31 as shown in FIGS. 12 and 13. The upper left guide groove 31a extends in a direction from a point in the vicinity of the border (corner) between the upper edge wall 30a and the left edge wall 30c toward the center of the monitor accommodating portion 30 (i.e., toward the imaginary line O'), the lower left guide groove 31b extends in a direction from a point in the vicinity of the border (corner) between the lower edge wall 30b and the left edge wall 30c toward the center of the monitor accommodating portion 30 (i.e., toward the imaginary line O'), the upper right guide groove 31c extends in a direction from a point in the vicinity of the border (corner) between the upper edge wall 30a and the right edge wall 30d toward the center of the monitor accommodating portion 30 (i.e., toward the imaginary line O'), and the lower right guide groove 31d extends in a direction from a point in the vicinity of the border (corner) between the lower edge wall 30b and the right edge wall 30d toward the center of the monitor accommodating portion 30 (i.e., toward the imaginary line O'). The upper left guide groove 31a and the lower right guide groove 31d are positioned on one of the two diagonal lines of the monitor accommodating portion 30. The lower left guide groove 31b and the upper right guide groove 31c are positioned on the other diagonal line of the monitor accommodating portion 30. In each guide groove 31 (31a, 31b, 31c and 31d), the end thereof closer to the center of the monitor accommodating portion 30 is referred to as the inner end, and the other end that is farther from the center of the monitor accommodating portion 30 is referred to as the outer end. The inner ends of the four guide grooves 31a, 31b, 31c and 31d are arranged to surround the imaginary line O'. The camera body 10 is further provided, at the bottom of the monitor accommodating portion 30 at two different positions in the leftward and rightward directions, with two positioning projections 32, respectively. The two positioning projections 32 can be fitted into the two through-holes 23f that are formed through the base plate 23. A magnet is installed in each positioning protrusion 32.

Figure 18:
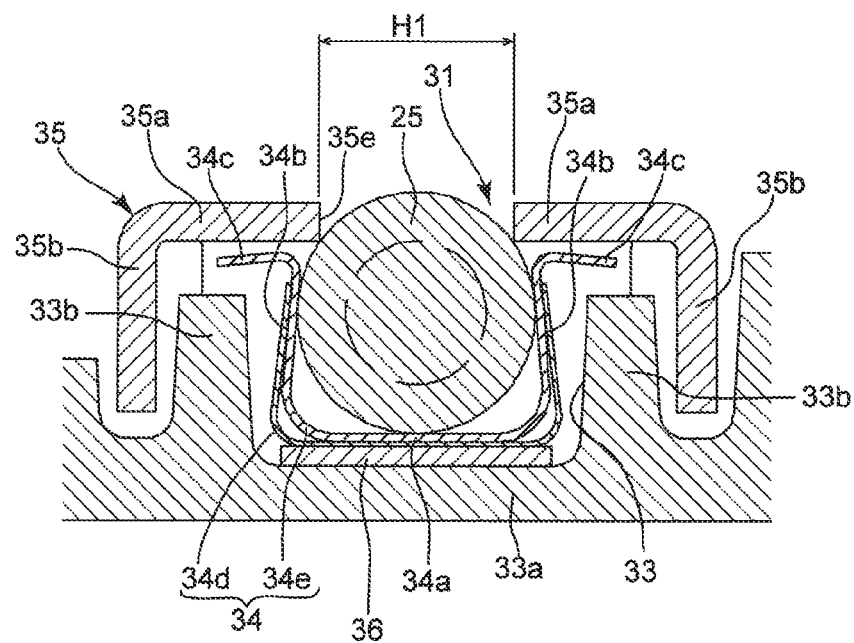
FIG. 18 is a cross sectional view illustrating a guide groove formed in the monitor accommodating portion into which one spherical end of one of the four support rods is inserted, taken along a plane orthogonal to the longitudinal direction of the guide groove.

As can be understood from the cross-sectional structure shown in FIG. 18, each guide groove 31 is configured from a combination of an internal guide 34 which is housed in a groove-shaped recess 33 formed in the monitor accommodating portion 30 and a cover member (retaining member) 35 which covers the internal guide 34. The groove-shaped recess 33 is formed as a space surrounded by a base wall 33a which is positioned at the base of the monitor accommodating portion 30 and a pair of erect walls 33b which project rearward (upward with respect to FIG. 18) from the base wall 33a and are spaced from each other in the widthwise direction of the guide groove 31 (the horizontal direction with respect to FIG. 18). The internal guide 34 is positioned between the pair of erect walls 33b with enough clearance in the widthwise direction of the guide groove 31, and the cover member 35 is installed onto the outer sides of the pair of erect walls 33b. As shown in FIG. 13, the internal guide 34 and the cover member 35 are each formed into a narrow shape elongated in the direction of extension of the guide groove 31.

The internal guide 34 has a substantially uniform cross sectional shape through the length thereof in the longitudinal direction of the guide groove 31. More specifically, as shown in FIG. 18, the internal guide 34 is provided with a base portion 34a, a pair of side walls (facing walls) 34b which project from both side ends of the base portion 34a and a pair of bent edge portions 34c which project in opposite directions away from each other from the ends (rear ends) of the pair of side walls 34b to thereby form a bottomed groove so that the area between the pair of bent edge portions 34c (i.e., the area immediately behind the base portion 34a (immediately above the base portion 34a with respect to FIG. 18)) is open rearwardly (open upwardly with respect to FIG. 18). The internal guide 34 includes an outer member 34d and an inner member 34e, each of which is made out of sheet metal and which are made to overlay each other. The outer member 34d has a U-shaped cross sectional shape and forms the base portion 34a and the pair of side walls 34b, while the inner member 34e has the pair of bent edge portions 34c in addition to a U-shaped cross sectional shape similar to the U-shaped cross sectional shape of the outer member 34d. The internal guide 34 can change the distance between the pair of side walls 34b by being resiliently deformed, and the distance between the pair of side walls 34b in a free state of the internal guide 34 is smaller than that in a completed (assembled) state shown in FIG. 18. More specifically, in this completed (assembled) state that is shown in FIG. 18, the pair of side walls 34b of the internal guide 34 are inclined in directions to progressively reduce the distance between pair of side walls 34b in the direction toward the pair of bent edge portions 34c from the base portion 34a; the degree of this inclination is much greater in a free state of the internal guide 34. In each guide groove 31, the internal guide 34 is inserted into the groove-shaped recess 33 with the pair of side walls 34b positioned between the pair of erect walls 33b, and the base portion 34a is supported on the base wall 33a via a cushioning material 36 which is sandwiched between the base portion 34a and the base wall 33a.

As shown in FIGS. 13 and 18, the cover member 35 is provided with a covering portion 35a, a pair of side walls 35b, an outer end wall 35c and an inner end wall 35d. The covering portion 35a is in the shape of a flat plate and extends in the longitudinal direction of the guide groove 31, the pair of side walls 35b are formed at both sides of the covering portion 35a in the widthwise direction thereof, the outer end wall 35c is formed at one end of the covering portion 35a in the longitudinal direction thereof, and the inner end wall 35d is formed at the other end of the covering portion 35a in the longitudinal direction thereof. The pair of side walls 35b, the outer end wall 35c and the inner end wall 35d are each formed as a wall which projects substantially orthogonally to the covering portion 35a. A slot (opening) 35e which is elongated in the longitudinal direction of the covering portion 35a is formed in the center, with respect to the widthwise direction, of the covering portion 35a. The slot 35e is formed through not only the covering portion 35a but also the outer end wall 35c and the inner end wall 35d. The slot 35e has a substantially uniform opening width H1 (see FIG. 18) across the length of the cover member 35 in the longitudinal direction thereof. The cover member 35 is divided (bifurcated) into two segments in the widthwise direction by the slot 35e, and these two segments are connected by a flange 35f of the cover member 35 that is formed continuously with the inner end wall 35d. Each side wall 35b is formed on a portion of the covering portion 35a in the longitudinal direction thereof, and a pair of flanges 35g are projected from both side ends of the covering portion 35a at different positions from the pair of side walls 35b. Through-holes into which fastening screws 60 (see FIG. 12) are inserted are formed through the flange 35f and the pair of flanges 35g of each cover member 35.

Each of the four cover members 35, which form (together with the internal guides 34) the four guide grooves 31, is each fixed to the monitor accommodating portion 30 after the orientation of the cover member 35 is set so that the end of the associated guide groove 31 in the longitudinal direction thereof on the side where the inner end wall 35d and the pair of flanges 35g are formed becomes the inner end of the guide groove 31 and so that the other end of the associated guide groove 31 in the longitudinal direction thereof, which is positioned on the side where the outer end wall 35c is formed, becomes the outer end of the guide groove 31. The monitor accommodating portion 30 is provided around each of the four groove-shaped recesses 33 with a plurality of support seats 37 (see FIG. 12) on which the flange 35f and the pair of flanges 35g of the associated cover member 35 can be mounted. Screw holes (not shown) are formed in the support seats 37. Each cover member 35 is fixed to the monitor accommodating portion 30 as shown in FIG. 12 by making the flange 35f and the pair of flanges 35g supported on the plurality of support seats 37a and screwing the screws 60 into the aforementioned screw holes (not shown) of the support seats 37 through the aforementioned through-holes, which are formed through the flange 35f and the pair of flanges 35g of each cover member 35.

The cover member 35 of each guide groove 31 which is fixed to the monitor accommodating portion 30 therein is positioned so that the covering portion 35a is positioned to face the pair of bent edge portions 34c and the ends (the upper ends with respect to FIG. 18) of pair of erect walls 33b of the groove-shaped recess 33 and that the pair of side walls 35b are positioned outside the pair of erect walls 33b as shown in FIG. 18. In addition, each of the four guide grooves 31 is defined by the base portion 34a and the pair of wide walls 34b of the internal guide 34, so that the slot 35e serves as the opening of the guide groove 31. The opening width H1 of the slot 35e is set smaller than the distance between the pair of side walls 34b, and the four guide grooves 31 are formed having a retaining structure in which the width of the opening defined by the slot 35e is smaller than the width of the interior defined by the pair of side walls 34b. This retaining structure also functions at each of the outer end and the inner end of the guide groove 31; specifically, the outer end wall 35c constitutes a retaining portion at the outer end of the guide groove 31 and the inner end wall 35d constitutes a retaining portion at the inner end of the guide groove 31.

Each of the upper edge wall 30a, the lower edge wall 30b, the left edge wall 30c and the right edge wall 30d, which surround the monitor accommodating portion 30, is not constant in rearwardly projecting amount from the base of the monitor accommodating portion 30; specifically, the upper edge wall 30a, the lower edge wall 30b, the left edge wall 30c and the right edge wall 30d are provided at mid-sections thereof with recesses 30e, 30f, 30g and 30h, respectively, which are smaller in rearwardly projecting amount from the base of the monitor accommodating portion 30 than the remaining portions of the upper edge wall 30a, the lower edge wall 30b, the left edge wall 30c and the right edge wall 30d. The recess 30e is formed at a center portion of the upper edge wall 30a in the leftward and rightward directions. The formation of the recess 30e prevents the upper edge wall 30a from interfering with the eyepiece window 15. The recess 30f is formed at a center portion of the lower edge wall 30b in the leftward and rightward directions and allows the flange 23g of the base plate 23 to enter. The recess 30g is formed at a center portion of the left edge wall 30c in the upward and downward directions and allows the flange 23h of the base plate 23 to enter. The recess 30h is formed at a center portion of the right edge wall 30d in the upward and downward directions and allows the flange 23i of the base plate 23 to enter. The upper end of the right edge wall 30d that is positioned between the upper edge wall 30a and the recess 30h is formed as a low wall 30i which is small in rearwardly projecting amount and progressively increases in rearwardly projecting amount from the low wall 30i to the upper edge wall 30a.

As shown in FIGS. 14 through 17, the movable monitor 20 is provided, on the side of the base plate 23 which faces the monitor accommodating portion 30 (i.e., the opposite side of the base plate 23 from the display 21), with four sockets (first support portion/support-stage connecting portion) 27. More specifically, the four sockets 27 are configured of an upper left socket 27a, a lower left socket 27b, an upper right socket 27c and a lower right socket 27d. The upper left socket 27a is positioned to face an area in the vicinity of the inner end of the guide groove 31a, the lower left socket 27b is positioned to face an area in the vicinity of the inner end of the guide groove 31b, the upper right socket 27c is positioned to face an area in the vicinity of the inner end of the guide groove 31c, and the lower right socket 27d is positioned to face an area in the vicinity of the inner end of the guide groove 31d.

Figure 16:
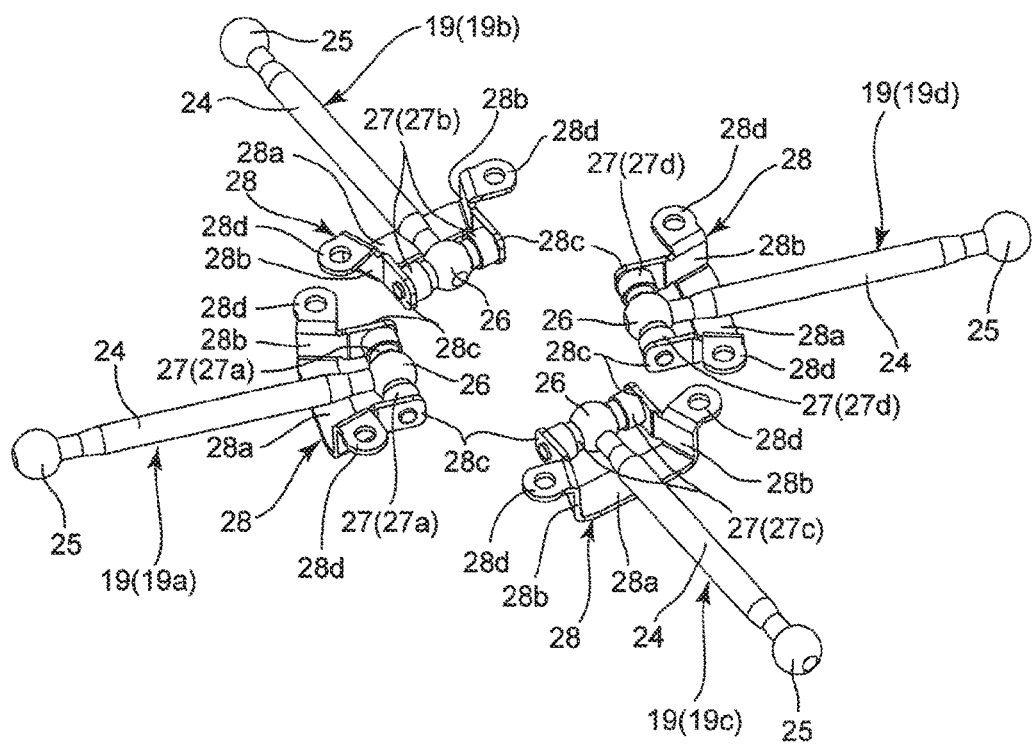
FIG. 16 is a perspective view of the elements of the support mechanism shown in FIG. 15 from which a base plate is removed for clarity.
Figure 17:
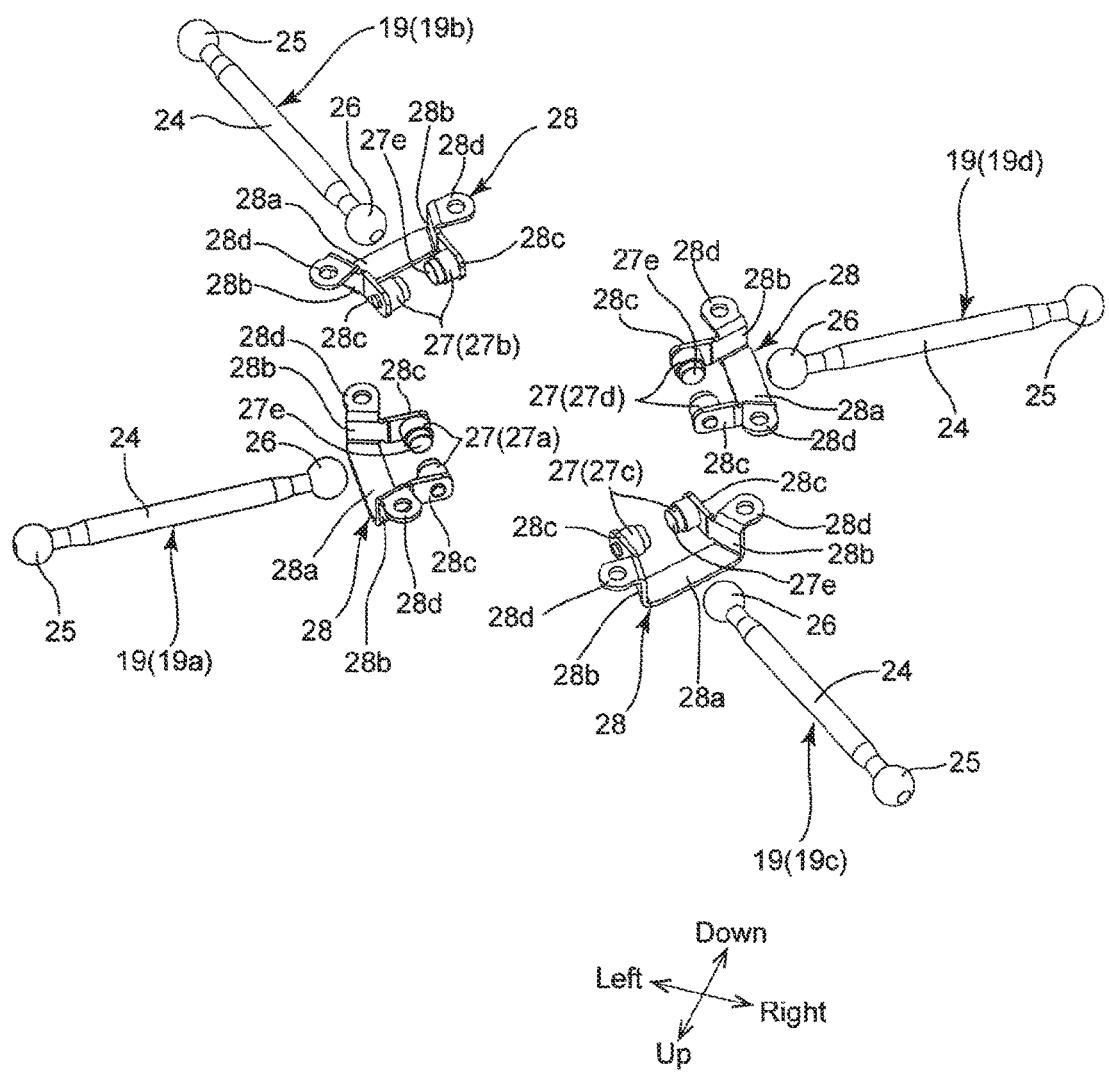
FIG. 17 is an exploded perspective view of the four support rods and the four sockets therefor that are shown in FIG. 16.

As shown mainly in FIGS. 16 and 17, the four sockets 27 are provided on the four retainers (concave-surface support members) 28, respectively. Each retainer 28 is provided with a base portion 28a, a pair of erect walls 28b which project from opposite ends of the base portion 28a, and a pair of support arms 28c which extend from the pair of erect walls 28b. Each retainer 28 can change the distance between the pair of support arms 28c thereof, which face each other, by being resiliently deformed, and one socket 27 is installed in between the facing surfaces of the pair of support arms 28c. Each socket 27 and retainer 28 can be provided either as separate members which are combined afterwards or as an integrated product. Each socket 27 includes of a pair of cylindrical members which project in opposite directions toward each other from the associated pair of support arms 28c, and a pair of retaining concave surfaces (spherical surfaces) 27e (see FIGS. 17 and 19) are formed on the facing surfaces of the aforementioned pair of cylindrical members. Each retainer 28 is further provided with a pair of flanges 28d which project sideways from the pair of erect walls 28b, and a through-hole into which a fastening screw 61 (see FIGS. 14 and 15) is inserted is formed through each flange 28d.

As shown in FIG. 15, the base plate 23 is provided with four support recesses (support member mounts) 40 into which the four retainers 28 can be inserted. The four support recesses 40 are arranged in the four areas between the center of the outer shape of the base plate 23 and the four cutouts 23a, 23b, 23c and 23d, respectively. Each retainer 28 is fitted into the associated support recess 40 with the base portion 28a facing the associated cutout 23a, 23b, 23c or 23d (i.e., with the base portion 28a positioned closer to the associated one of the four corners of the base plate 23, where the associated cutouts 23a, 23b, 23c and 23d are formed) and with the pair of support arm 28c positioned farther from the associated cutout 23a, 23b, 23c or 23d (i.e., with the pair of support arm 28c positioned closer to the center of the outer shape of the base plate 23). Each support recess 40 is provided with a bottom surface which supports the base portion 28a of the associated retainer 28 and a pair of side walls which hold the pair of support arms 28c therebetween, and the distance between the side walls of each support recess 40 is set slightly smaller than the distance between the pair of support arms 28c of the associated retainer 28 in a free state (by itself). Therefore, mounting each retainer 28 to the associated support recess 40 causes the pair of support arms 28c to be resiliently deformed in opposite directions to reduce the distance therebetween, thereby causing the distance between the pair of retaining concave surfaces 27e of the associated socket 27 to become smaller than that when the retainer 28 is in a free state. The base plate 23 is provided around the four support recesses 40 with a plurality of support seats 41 on which the four pairs of flanges 28d are mountable, and a screw hole is formed in each support seat 41. Each retainer 28 is fixed to the base plate 23 by making each flange 28d mounted on the associated support seat 41 to be supported thereon and screwing one screw 61 into the screw hole of this support seat 41 through the aforementioned through-hole of the flange 28*d* (see FIG. 15). In a state where the four retainers 28 are fixed to the base plate 23, the socket 27*a* and the socket 27*d* are aligned on one of the two diagonal lines of the movable monitor 20, while the socket 27*b* and the socket 27*c* are aligned on the other diagonal line of the movable monitor 20.

As shown in FIG. 14, a presser plate 29 is further fixed to the base plate 23. The base plate 23 is provided on the front surface thereof with a plurality of support seats 42 (see FIG. 15) each having a screw hole at the center thereof, and the presser plate 29 is fastened to the base plate 23 by screwing screws 62 (see FIG. 14) into the screw holes of the support seats 42 with the presser plate 29 mounted on the support seats 42. The presser plate 29 is provided with a plurality of retaining portions 29*a* that shaped to cover the adjacent support arm 28*c* of the associated retainer 28 and the adjacent socket 27.

The movable monitor 20 is connected to the camera body 10 via four support rods (connecting members) 19. As shown in FIGS. 14 through 17, each support rod 19 is configured of a rod-shaped portion 24 and two spherical ends (a second connecting portion) 25 and (a first connecting portion) 26 which are formed at one end and the other end (outer and inner ends) of the rod-shaped portion 24, respectively. The spherical ends 25 of the four support rods 19 are engaged in the four guide grooves 31, which are formed in the monitor accommodating portion 30, while the spherical ends 26 of the four support rods 19 are engaged in the four sockets 27, which are provided on the base plate 23. Each of the spherical ends 25 and 26 is a spherical body which is connected to the associated guide groove 31 or socket 27 to be capable of rotating about the spherical center of the spherical body (i.e., to be freely rotatable with no restrictions on rotational direction) to provide a ball joint structure allowing the orientation of each of the camera body 10 and the movable monitor 20 to change relative to the support rods 19 with great flexibility. In addition, each spherical end 25 is engaged in the associated guide groove 31 and supported thereby to be slidably movable in the longitudinal direction of the associated guide groove 31. The four support rods 19 are provided and arranged at positions corresponding to the four guide grooves 31 and the four sockets 27. Specifically, the upper left support rod 19*a* connects the upper left guide groove 31*a* with the upper left socket 27*a*, the lower left support rod 19*b* connects the lower left guide groove 31*b* with the lower left socket 27*b*, the upper right support rod 19*c* connects the upper right guide groove 31*c* with the upper right socket 27*c*, and the lower right support rod 19*d* connects the lower right guide groove 31*d* with the lower right socket 27*d*.

The diameter of the rod-shaped portion 24 of each support rod 19 is set to allow the rod-shaped portion 24 to pass through the slot 35*e* of the associated cover member 35, which constitutes an element of the associated guide groove 31. When each support rod 19 is connected to the associated guide groove 31, the rod-shaped portion 24 is inserted into the slot 35*e* of the associated cover member 35 to combine the support rod 19 and the associated cover member 35 with the spherical end 25 pointed toward the back of the covering portion 35*a* (in the projecting direction of the pair of side walls 35*b*, the outer end wall 35*c* and the inner end wall 35*d*). Subsequently, when the cover members 35 are mounted to the support seats 37 of the monitor accommodating portion 30 and fastened thereto by the screws 60 with the internal guides 34 inserted and supported in the groove-shaped recesses 33, the spherical ends 25 of the support rods 19 are engaged in the internal guides 34 and are prevented from being disengaged from the internal guides 34 by the cover members 35 as shown in FIG. 18. At this stage, the spherical end 25 of each support rod 19 is inserted into the associated internal guide 34 while sliding on the curved portions thereof formed at the boundaries between the pair of side walls 34*b* and the pair of bent edge portions 34*c* of the internal guide 34, without the spherical end 25 of each support rod 19 catching on the associated internal guide 34, thus making it possible to achieve smooth installation of the spherical end 25 of each support rod 19 to the associated guide groove 31.

FIG. 18 shows a state where the installation of the spherical end 25 of each support rod 19 to the associated guide groove 31 has been completed. Each spherical end 25 is supported by point contact with the base portion 34*a* and the pair of side walls 34*b* of the internal guide 34 of the associated guide groove 31, and is in slidable contact with a portion of the covering portion 35*a* of the associated cover member 35 in the vicinity of the slot 35*e* thereof. The diameter of the spherical ends 25 is greater than the opening width H1 of the slots 35*e* and the (minimum) distance between the pair of side walls 34*b* in a free state, so that the spherical end 25 of each support rod 19 is held in the internal guide 34 of the associated guide groove 31 with the space between the pair of side walls 34*b* (which are resiliently deformable) widened to be greater than that in a free state. The resiliency of the internal guide 34 of each guide groove 31 thus resiliently deformed applies a predetermined magnitude of friction to the spherical end 25 of the associated support rod 19. This friction is predetermined to have a magnitude which prevents the spherical ends 25 from being unintentionally moved in the guide grooves 31 by the weight of the movable monitor 20 or a small external force applied to the movable monitor 20, while allowing the spherical ends 25 to move in the guide grooves 31 (slide in the guide grooves 31 in the longitudinal directions thereof/rotate about the spherical centers of the spherical ends 25) upon a force greater than a predetermined magnitude being intentionally applied to the movable monitor 20 to manually move the movable monitor 20. Efficient application of friction to the spherical ends 25 of the four support rods 19 has been achieved by the formation of the internal guide 34 of each guide groove 31 from two layered metal plates: the outer member 34*d* and the inner member 34*e*.

The spherical end 25 of each support rod 19 is held between the covering portion 35*a* of the cover member 35 of the associated guide groove 31 and the base portion 34*a* of the internal guide 34 of the associated guide groove 31. Since the base portion 34*a* of the internal guide 34 of each guide groove 31 is supported via the cushioning material 36, the distance between the base portion 34*a* and the covering portion 35*a* with the spherical end 25 held therebetween is appropriately maintained, which makes it possible to prevent the spherical ends 25 from rattling in the depth direction of the guide grooves 31. Specifically, in each guide groove 31, the distance between the covering portion 35*a* of the cover member 35 and the base portion 33*a* of the groove-shaped recess 33 is set so that the cushioning material 36, which is sandwiched between the internal guide 34 and the base portion 33*a*, is slightly compressed when the cover member 35 is fixed to the support seats 37 of the monitor accommodating portion 30 with the screws 60. At the same time, the hardness and the deformation amount of the cushioning material 36 (the holding force by the base portion 34*a* and the covering portion 35*a* to hold the spherical end 25) are determined to prevent the sliding resistance to the spherical end 25 in the guide groove 31 from becoming excessively great.

As shown in FIGS. 12 and 13, the rod-shaped portion 24 of each support rod 19, which is formed to be continuous with the spherical end 25, is extended toward the outside of the associated guide groove 31 through the slit 35e thereof. As shown in FIG. 18, the diameter of the spherical ends 25 is greater than the opening width H1 of the slots 35e, so that the spherical end 25 of each support rod 19 is prevented from moving in a direction to be disengaged from the associated guide groove 31 (in a direction away from the base wall 33a and the base portion 34a of the associated guide groove 31) by the covering portion 35a of the associated cover member 35. Additionally, as shown in FIGS. 12 and 13, contact of the spherical end 25 of each support rod 19 with the inner end wall 35d of the associated cover member 35 prevents the spherical end 25 from moving further toward the inner end of the associated guide groove 31 (i.e., defines the limit of travel of the spherical end 25 toward the inner end of the associated guide groove 31). Conversely, contact of the spherical end 25 of each support rod 19 with the outer end wall 35c of the associated cover member 35 prevents the spherical end 25 from moving further toward the outer end of the associated guide groove 31 (i.e., defines the limit of travel of the spherical end 25 toward the outer end of the associated guide groove 31).

Figure 19:
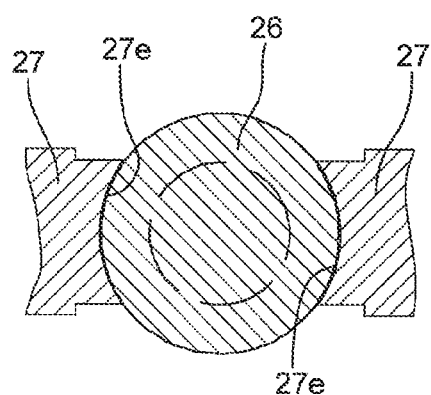
FIG. 19 is a cross sectional view illustrating a state where the other spherical end of the one support rod is held by the associated socket.

FIG. 17 shows a state before the spherical end 26 of each support rod 19 is installed into the associated socket 27, and FIG. 16 shows a state after the spherical end 26 of each support rod 19 is installed to the associated socket 27. As shown in FIG. 19, the spherical end 26 of each support rod 19 in a state of being installed to the associated socket 27 is held between the pair of retaining concave surfaces 27e. The pair of retaining concave surfaces 27e of each socket 27 are concave spherical surfaces (portions of the surface of a sphere) on which the spherical outer surface of the spherical end 26 of the associated support rod 19 is fitted, which allows the spherical end 26 of the associated support rod 19 to rotate about its spherical center relative to the associated socket 27. The following two options are available as a relationship between each retaining concave surface 27e and the associated spherical end 26: (1) the curvatures of each retaining concave surface 27e and the surface of the associated spherical end 26 are formed substantially the same as each other to make each retaining concave surface 27e come in surface contact with the associated spherical end 26, and (2) the curvatures of each retaining concave surface 27e and the surface of the associated spherical end 26 are formed different from each other to make each retaining concave surface 27e come in partial contact (line contact/point contact) with the associated spherical end 26. In the case where the curvatures of each retaining concave surface 27e and the surface of the associated spherical end 26 are formed different from each other, if each retaining concave surface 27e is made larger in curvature than the surface of the associated spherical end 26, each retaining concave surface 27e comes in line contact (circular line contact) with the surface of the associated spherical end 26, which is desirable in terms of reduction of rattling/unsteadiness of each spherical end 26 during rotation thereof about the spherical center thereof. This type of structure has been adopted in the present embodiment.

As shown in FIG. 15, fixing each retainer 28 to the associated support recess 40 of the base plate 23 with the spherical end 26 of the associated support rod 19 held by the associated socket 27 causes the pair of support arms 28c of each retainer 28 to be resiliently deformed in mutually approaching directions to reduce the distance therebetween by the pair of side walls of the associated support recess 40, which enhances the force of the socket 27 to hold the spherical end 26, thereby making the ball joint structure come into a holding state where the spherical end 26 of each support rod 19 is prevented from coming off the associated socket 27. In this state, the resiliency of the pair of support arms 28c of each retainer 28 thus resiliently deformed applies a predetermined magnitude of friction to the spherical end 26 of the associated support rod 19. This friction is predetermined to have a magnitude which prevents the spherical end 26 of each support rod 19 from being rotated about the spherical center thereof relative to the associated socket 27 by the weight of the movable monitor 20 or a small external force applied to the movable monitor 20, while allowing the spherical end 26 of each support rod 19 to rotate about its spherical center relative to the associated socket 27 upon an intentional force greater than a predetermined magnitude being applied to the movable monitor 20 to manually move the movable monitor 20.

In addition, when the presser plate 29 is fixed to the base plate 23 as shown in FIG. 14, the plurality of retaining portions 29a of the presser plate 29 cover the pair of support arms 28c of each retainer 28 and each socket 27. Even when the capability of holding the spherical ends 26 by the sockets 27 is influenced by, e.g., the application of an excessively great tensile force on the support rods 19 (e.g., if the rims of the retaining concave surfaces 27e of the sockets 27 are chipped by the spherical ends 26), the spherical ends 26 can still be prevented from coming off the support recesses 40.

As described above, the monitor accommodating portion 30 of the camera body 10 and the movable monitor 20 are mechanically connected via the four support rods 19 (19a, 19b, 19c and 19d). Next, the routing structure for the flexible board 18 that electrically connects the camera body 10 and the movable monitor 20 will be discussed hereinafter. As shown in FIGS. 2, 4, 7, 9, 11, 12, 20 and 21, the camera body 10 is provided in the vicinity of the center of the monitor accommodating portion 30 with a board insertion hole (outer-to-inner communicably connected insertion through-hole) 43 which is formed as a through-hole. As shown in FIGS. 14, 15, 20 and 21, the base plate 23 of the movable monitor 20 is provided, on the front side thereof that faces the monitor accommodating portion 30, with a board accommodating recess 44 and a board guiding recess 45. Each of the board accommodating recess 44 and the board guiding recess 45 is positioned at an approximate center of the base plate 23 in the leftward and rightward directions and has the shape of a groove elongated in the upward and downward directions (see FIGS. 14 and 15).

The upper end of the board accommodating recess 44 is positioned in the vicinity of the center of the outer shape of the base plate 23, and the board accommodating recess 44 is formed to extend downward from the upper end thereof through a space between the lower left socket 27b and the lower right socket 27d. The base plate 23 is provided at the lower end of the board accommodating recess 44 with an inclined surface (slope) 44a which is inclined to progressively reduce the depth of the board accommodating recess 44 in the downward direction. The lower end of the board guiding recess 45 is positioned in the space between the upper left socket 27a and the upper right socket 27b, and the upper end of the board guiding recess 45 is open at an upper edge of the base plate 23 to be formed as an upper end opening 45a. As shown in FIGS. 14, 20 and 21, the presser plate 29 is provided with a covering portion 29b which is fitted in the board guiding recess 45. In a state where the presser plate 29 is fixed to the base plate 23, a clearance allowing the flexible board 18 to be inserted is secured between the bottom surface of the board guiding recess 45 and the covering portion 29b.

As shown in FIGS. 20 and 21, a communication path 46 via which the upper end of the board accommodating recess 44 and the lower end of the board guiding recess 45 are communicatively connected is formed inside the base plate 23. The board accommodating recess 44 is greater in depth from the front of the base plate 23 than the board guiding recess 45, and the communication path 46 is provided with a narrowed portion (intermediate support portion/hole section) 46a and a front-to-rear extending through-hole 46b. The narrowed portion 46a is communicatively connected with the upper end of the board accommodating recess 44 and extends in the upward and downward directions, and the front-to-rear extending through-hole 46b extends through the base plate 23 in the forward and rearward directions to communicatively connect the narrowed portion 46a and the lower end of the board guiding recess 45. The narrowed portion 46a is a through-hole, the width (hole width) of which in the forward and rearward directions is smaller than the depth of the board accommodating recess 44 in the forward and rearward directions. The front side of the front-to-rear extending through-hole 46b is covered by the presser plate 29.

As shown in FIGS. 20 and 21, the support frame 22 of the movable monitor 20 is provided with a board insertion hole 47 between the left and right pair of shaft support portions 22e. The movable monitor 20 is provided between the support frame 22 and the display 21 with a board accommodating space 48. The movable monitor 20 is provided in the board accommodating space 48 with the monitor circuit board 55. The monitor circuit board 55 controls operations of the electrical components provided in the movable monitor 20 and performs signal communications with the body circuit board 17 of the camera body 10 via the flexible board 18. For instance, the monitor circuit board 55 controls the operation to indicate images and pieces of information on the display 21 and the operation to turn a backlight for illumination ON and OFF. In addition, in the case where the display 21 is configured as a touchscreen display that is controlled by touching the screen, the monitor circuit board 55 handles the touchscreen input sensing and performs an operation to send input signals to the body circuit board 17. Additionally, it is possible to provide the movable monitor 20 with one or more manual operation inputters (e.g., manual operation buttons) other than a touchscreen and to make the monitor circuit board 55 perform an input signal processing for signals input from the manual operation inputters and an operation to send the input signals thus processed to the body circuit board 17. Additionally, it is also possible to provide the movable monitor 20 with a sensor therein which detects variations of the position of the movable monitor 20 relative to the camera body 10 and to make the monitor circuit board 55 perform an input signal processing for signals input from the aforementioned sensor and perform an operation to send the input signals thus processed to the body circuit board 17.

As shown in FIGS. 20 and 21, the flexible board 18 is connected at one end 18a thereof to the body circuit board 17, which is provided in the camera body 10, and connected at the other end 18b to the monitor circuit board 55, which is provided in the movable monitor 20. The routing structure of the flexible board 18 with the end 18a as a starting point will be discussed hereinafter. The flexible board 18, which is connected via the end 18a to near the lower end of the body circuit board 17, is routed upward alongside a front surface (inner surface) (the right surface with respect to FIGS. 20 and 21) of the base wall of the monitor accommodating portion 30 in the camera body 10, is subsequently routed rearward through the board insertion hole 43 to extend toward the rear of the monitor accommodating portion 30, and thereafter is inserted into the narrowed portion 46a of the communication path 46 through the board accommodating recess 44 in the base plate 23. A portion of the outer surface of the flexible board 18 over the range from the board insertion hole 43 to the narrowed portion 46a is sheathed with aboard cover 57. The board cover 57 is made of a water-impermeable material (e.g., silicon rubber) and is flexible, being deformable together with the flexible board 18. One end of the board cover 57 is connected to the board insertion hole 43 and the other end of the board cover 57 is connected to the narrowed portion 46a in a weather-proof (watertight) fashion. More specifically, the gap between the board insertion hole 43 and the board cover 57 are sealed liquidtight (watertight) by a flange portion 57a, which is provided at one end of the board cover 57, being held between the periphery of the board insertion hole 43 and a retaining plate 58 (see FIGS. 20 and 21) in the monitor accommodating portion 30. In addition, the thickness of the board cover 57 is set greater than the internal width of the narrowed portion 46a in the forward and rearward directions, and the gap between the narrowed portion 46a and the board cover 57 is sealed liquid-tight by press-fitting an insertion end 57b of the board cover 57 (which is provided at the other end thereof) into the narrowed portion 46a. Additionally, to further enhance the weather-proof performance, the periphery of the flange portion 57a and the periphery of the insertion end 57b can be filled with a sealing agent. Additionally, the weather-proof performance can be enhanced by an adhesive for bonding and fixing the periphery of the flange portion 57a and the periphery of the insertion end 57b. The base plate 23 is structured so that such a sealing agent or an adhesive can be easily injected into the periphery of the insertion end 57b through the front-to-rear extending through-hole 46b. In the present embodiment of the camera 1, an adhesive is applied to the front-to-rear extending through-hole 46b to fix the insertion end 57b to the base plate 23, and an adhesive is applied to the inner side of the flange portion 57a so as to seal the gap between the flange portion 57a and the flexible board 18 in a liquidtight fashion within a range not protruding forward from the retaining plate 58. This sealing of the inner side of the flange portion 57a with an adhesive makes it possible to maintain liquidtightness of the interior of the camera body 10 even when the board cover 57 is torn at a point from the flange portion 57a onward.

The portion of the flexible board 18 which is sheathed by the board cover 57 is visibly exposed from outside the camera 1 and flexibly changes the shape when the movable monitor 20 is manually moved (in a manner which will be discussed later), thus being desirably protected by the board cover 57. In addition, the flexible board 18 itself is weather-proof; however, the flexible board 18 can attain higher level of weather-proof performance by sheathing the flexible board 18 with the board cover 57. Since the board cover 57 seals the gap between the board insertion hole 43 and the board cover 57 in a liquidtight fashion by the periphery of the flange portion 57a as described above, the protection of the flexible board 18 and the securement of weather-proof performance of the camera body 10 can be easily and reliably achieved by using the board cover 57.

The portion of the flexible board 18 which projects from the insertion end 57b of the board cover 57 in the front-to-rear extending through-hole 46b of the communication path 46 is routed toward the upper edge of the base plate 23 through the board guiding recess 45. In this area, stable support for the flexible board 18, together with protection of the flexible board 18, has been achieved by the flexible board 18 being held between the bottom surface of the board guiding recess 45 and the covering portion 29b of the presser plate 29. The support range of the base plate 23 for the flexible board 18 extends up to the upper opening 45a of the base guide recess 45, and the portion of the flexible board 18 which extends from the upper end opening 45a is routed into the board accommodating space 48, which is provided between the support frame 22 and the display 21, through the board insertion hole 47. An adhesive is injected into the board insertion hole 47 to fix the flexible board 18 and seal the board insertion hole 47 in a liquidtight fashion. The flexible board 18 is appropriately folded inside the board accommodating space 48, and the end 18b of the flexible board 18 is connected to the monitor circuit board 55. The portion of the flexible board 18 which extends from the upper end opening 45a to the board insertion hole 47 only deforms by a small amount when the movable monitor 20 is manually moved and also is externally exposed by a small amount (as will be discussed later), and accordingly, this portion of the flexible board 18 is not sheathed with a protection member like the board cover 57 that sheathes the flexible board 18 in the present embodiment of the camera 1.

In summary, the flexible board 18 is supported in different manners at the following different sections: a first section 18c which extends from the end 18a of the flexible board 18, which is connected to the body circuit board 17 in the camera body 10, to the board insertion hole 43 that is provided in the back of the camera body 10; a second section (first deformable section) 18d which extends from the board insertion hole 43 to a point immediately before the narrowed portion 46a of the communication path 46 of the base plate 23; a third section (intermediate supported section) 18e which extends from the portion of the flexible board 18 which is held by the narrowed portion 46a to the upper end opening 45a of the board guiding recess 45; a fourth section (second deformable section) 18f which extends from the upper end opening 45a to the board insertion hole 47 of the support frame 22; and a fifth section 18g which extends from the board insertion hole 47 to the portion of the flexible board 18 which is connected to the monitor circuit board 55. The first section 18c is a section of the flexible board 18 which is fixedly supported inside the camera body 10, the third section 18e is a section of the flexible board 18 which is supported so as to be prevented from moving relative to the base plate 23, and the fifth section 18g is a section which is accommodated and supported in the board accommodating space 48 in the support frame 22. Each of the second section 18d and the fourth section 18f is a deformable section which flexibly deforms in accordance with movement of the movable monitor 20 without being fixedly supported. The board cover 57 is arranged in the second section 18d.

Operations of the movable monitor 20, which has the above described support structure, relative to the camera body 10 will be discussed hereinafter. FIGS. 1 and 20 show a state where the movable monitor 20 is in the initial position, in which the movable monitor 20 is totally accommodated in the monitor accommodating portion 30 of the camera body 10. When the movable monitor 20 is in the initial position, the two positioning projections 32 are fitted into the two through-holes 23f of the base plate 23, thereby fixing the position of the movable monitor 20. Two magnets respectively installed in the two positioning projections 32 attract the base plate 23 by the magnetic force of the two magnets to hold the movable monitor 20 in the initial position. In addition, the upper side portion 22a, the lower side portion 22b (the flange 23g), the left side portion 22c (the flange 23h) and the right side portion 22d (the flange 23i) of the movable monitor 20 are positioned alongside the upper edge wall 30a, the lower edge wall 30b, the left edge wall 30c and the right edge wall 30d, respectively, which surround the monitor accommodating portion 30. The orientation of the movable monitor 20 in the initial position is set so that the display screen 21a of the display 21 is substantially orthogonal to the optical axis O (more specifically, orthogonal to the imaginary line O' that is extended rearward from the optical axis O). The angle of the movable monitor 20 at this orientation is defined as a reference angle of the movable monitor 20.

When the movable monitor 20 is in the initial position, the spherical ends 25 of the support rods 19a, 19b, 19c and 19d are positioned in the vicinity of the outer ends of the four guide grooves 31 (i.e., in the vicinity of the outer end walls 35c of the four cover members 35), and the rising angle (projecting amount) of each support rod 19a, 19b, 19c and 19d relative to the monitor accommodating portion 30 is the smallest. FIGS. 14 and 15 show the support rod 19a, 19b, 19c and 19d in this state; as can be seen from these drawings, the support rods 19a and 19d extend in the direction of one of the two diagonal lines of the rectangular movable monitor 20, while the support rods 19b and 19c extend in the direction of the other diagonal line. In this state, the axis of the rod-shaped portion 24 of each support rod 19a, 19b, 19c and 19d is in a state of extending in the longitudinal direction of the associated guide groove 31a, 31b, 31c or 31d, and a major portion of the rod-shaped portion 24 of each support rod 19a, 19b, 19c and 19d is accommodated in the associated guide groove 31a, 31b, 31c or 31d.

The four cover members 35, which constitute elements of the four guide grooves 31a, 31b, 31c and 31d, protrude rearward from the bottom surface of the monitor accommodating portion 30 (see FIG. 12); however, when the movable monitor 20 is in the initial position, the support mechanism (the guide grooves 31, the sockets 27 and the support rods 19) is prevented from interfering with the movable monitor 20 by the rearwardly protruding portions of the four guide grooves 31a, 31b, 31c and 31d and the rod-shaped portions 24 and the spherical ends 25 of the four support rods 19a, 19b, 19c and 19d which are positioned in the four guide grooves 31a, 31b, 31c and 31d entering into the four cutouts 23a, 23b, 23c and 23d of the base plate 23, respectively. Accordingly, by forming the four cutouts 23a, 23b, 23c and 23d on the base plate 23 to correspond to the shapes of the protrusions on the monitor accommodating portion 30 allows the movable monitor 20 to be accommodated in the monitor accommodating portion 30 in a space efficient manner, thus making it possible to minimize the thickness of the camera 1 in the forward/rearward directions.

As shown in FIG. 20, when the movable monitor 20 is in the initial position, the portion (the second section 18d) of the flexible board 18 which is covered by the board cover 57 is folded and accommodated in the space between the base of the monitor accommodating portion 30 and the board accommodating recess 44 of the base plate 23. Specifically, in the state shown in FIG. 20, the flexible board 18 and the board cover 57 are extended downwardly from the board insertion hole 43 and subsequently folded upward at a point before reaching (i.e., a point above) the inclined surface 44a of the board accommodating recess 44, which is provided at the lower end of the board accommodating recess 44, to extend upwardly along the board accommodating recess 44. Since the board accommodating recess 44 is formed on a portion of the base plate 23 which does not overlap the cutouts 23a, 23b, 23c and 23d (see FIGS. 14 and 15), the flexible board 18 and the board cover 57, which are accommodated along the board accommodating recess 44, can be accommodated in between the movable monitor 20 and the monitor accommodating portion 30 in a space-efficient manner without interfering with the adjacent components such as the four sockets 27.

Figure 2:
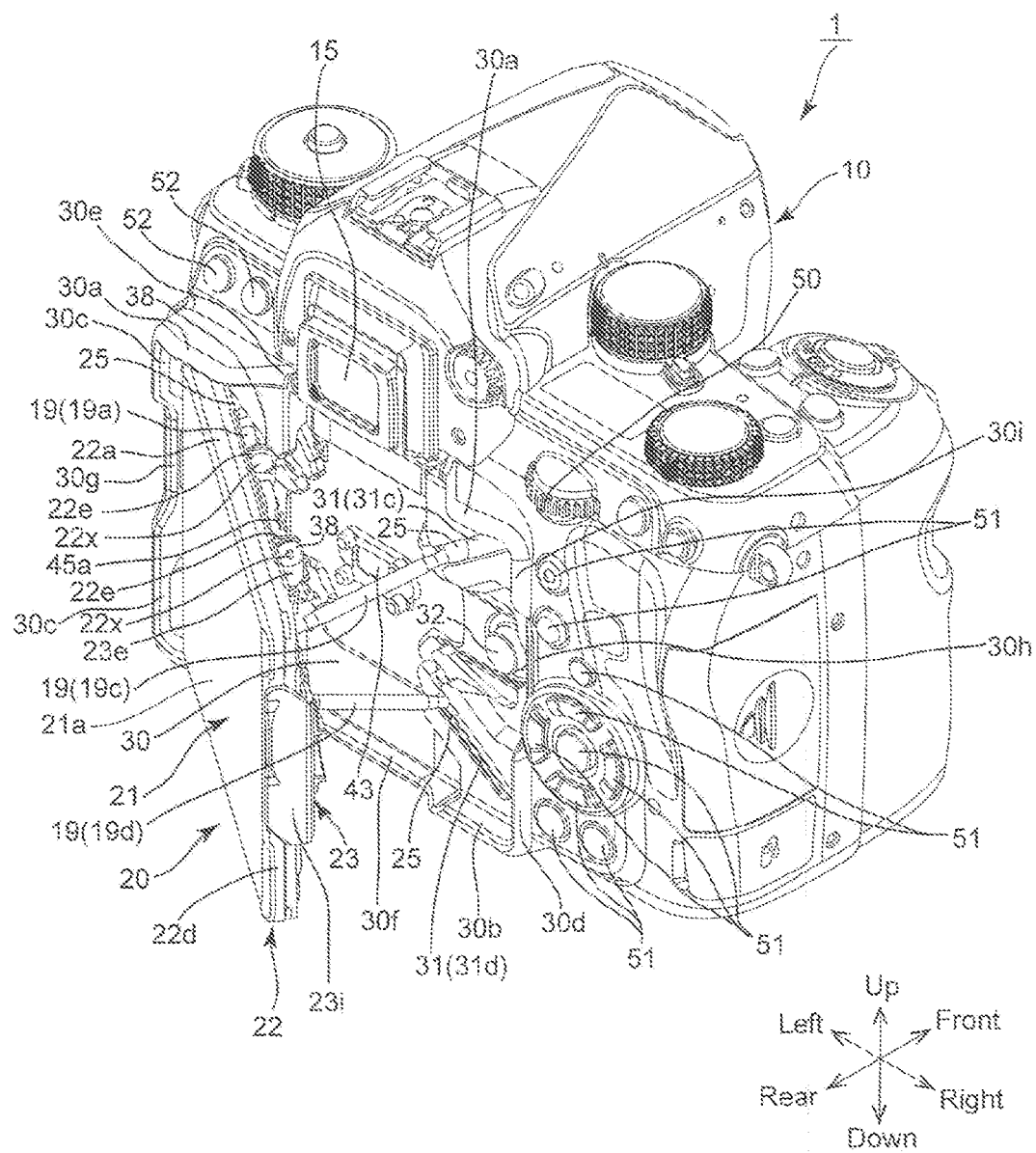
FIG. 2 is a rear perspective view of the SLR camera with the movable monitor tilted leftward.

As shown in FIGS. 2 through 5, the movable monitor 20 can be tilted vertically and horizontally in four directions (i.e., in the upward and downward directions and the leftward and rightward directions) from the aforementioned reference angle of the movable monitor 20 in the initial position thereof. FIG. 2 shows a state where the movable monitor 20 is tilted leftward about an axis extending in the upward and downward directions. The movable monitor 20 is tilted leftward with the contact portion between the left side portion 22c (the flange 23h) and the left edge wall 30c serving as a fulcrum by pulling the right side portion 22d (the flange 23i) of the movable monitor 20 rearwardly. In this tilting operation, each of the upper right support rod 19c and the lower right support rod 19d increases the rising angle (projecting amount) thereof relative to the monitor accommodating portion 30 while moving the associated spherical end 25 toward the inner end (the inner end wall 35d) of the associated guide groove 31c or 31d from a portion of this guide groove in the vicinity of the outer end (the outer end wall 35c) thereof, thereby pushing the upper right socket 27c and the lower right socket 27d rearward to tilt the movable monitor 20 leftward. FIG. 2 shows a state where the movable monitor 20 is tilted leftward to a maximum angle by pulling the upper right support rod 19c and the lower right support rod 19d. In this state, the spherical ends 25 of the upper right support rod 19c and the lower right support rod 19d are positioned in the vicinity of the inner ends of the guide grooves 31c and 31d, respectively, and are prevented from moving further diagonally inwards by the associated end walls 35d. Additionally, the rising angles of the upper left support rod 19a and the lower left support rod 19b relative to the monitor accommodating portion 30 are smaller than those of the upper right support rod 19c and the lower right support rod 19d, respectively, and the spherical end 25 of each of the upper left support rod 19a and the lower left support rod 19b sits in the associated guide groove 31a or 31b at an approximate center in the longitudinal direction thereof.

Figure 3:
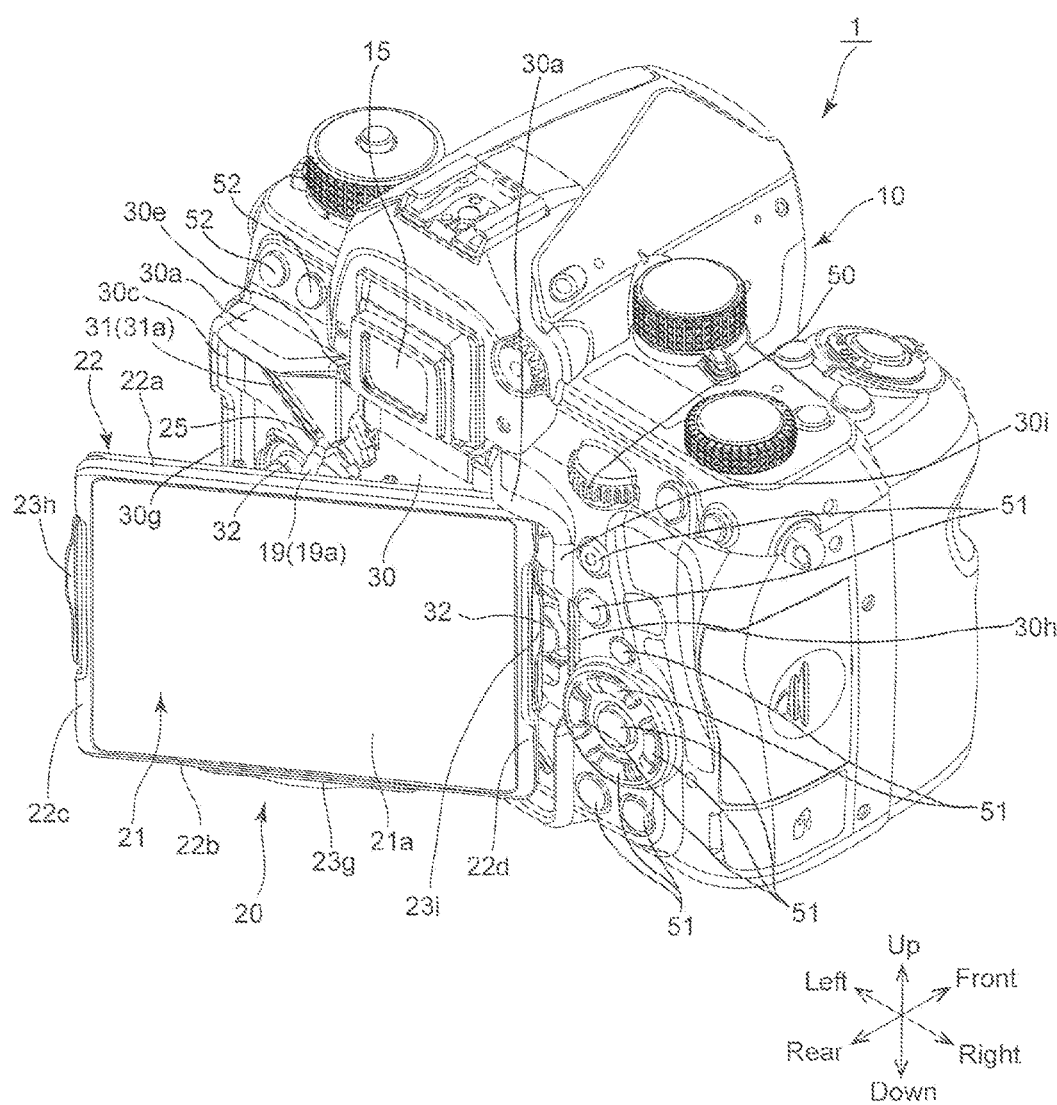
FIG. 3 is a rear perspective view of the SLR camera with the movable monitor tilted rightward.

FIG. 3 shows a state where the movable monitor 20 is tilted rightward about an axis extending in the upward and downward directions. The movable monitor 20 is tilted rightward with the contact portion between the right side portion 22d (the flange 23i) and the right edge wall 30d serving as a fulcrum by pulling the left side portion 22c (the flange 23h) of the movable monitor 20 rearwardly. In this tilting operation, each of the upper left support rod 19a and the lower left support rod 19b increases the rising angle (projecting amount) thereof relative to the monitor accommodating portion 30 while moving the associated spherical end 25 toward the inner end (the inner end wall 35d) of the associated guide groove 31a or 31b from a portion of this guide groove in the vicinity of the outer end (the outer end wall 35c) thereof, thereby pushing the upper left socket 27a and the lower left socket 27b rearward to tilt the movable monitor 20 rightward. FIG. 3 shows a state where the movable monitor 20 is tilted rightward to a maximum angle by pulling the upper left support rod 19a and the lower left support rod 19b. In this state, the spherical ends 25 of the upper left support rod 19a and the lower left support rod 19b are positioned in the vicinity of the inner ends of the guide grooves 31a and 31b, respectively, and are prevented from moving further diagonally inwards by the associated end walls 35d. Additionally, the rising angles of the upper right support rod 19c and the lower right support rod 19d relative to the monitor accommodating portion 30 are smaller than those of the upper left support rod 19a and the lower left support rod 19b, respectively, and the spherical end 25 of each of the upper right support rod 19c and the lower right support rod 19d sits in the associated guide groove 31c or 31d at an approximate center in the longitudinal direction thereof.

Figure 4:
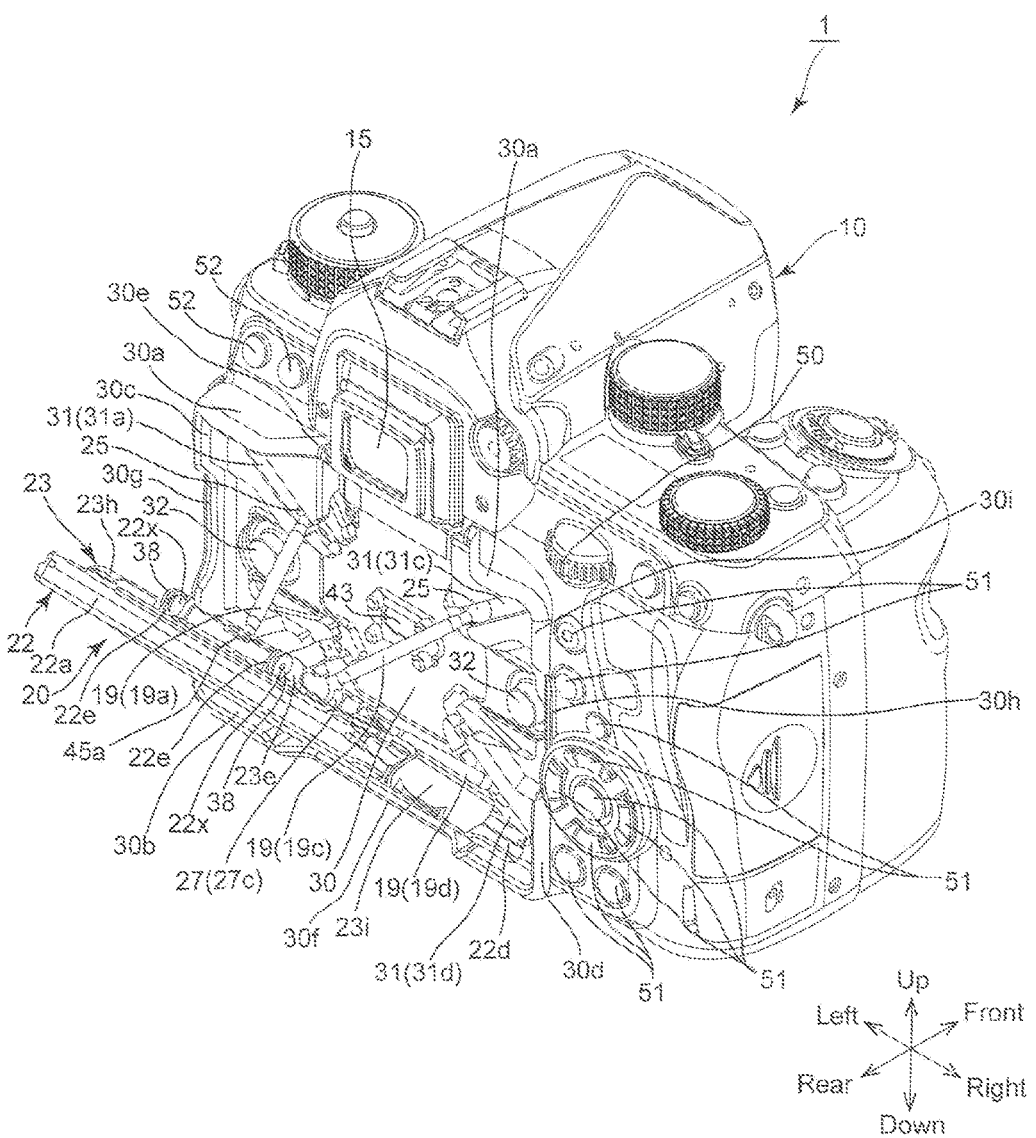
FIG. 4 is a rear perspective view of the SLR camera with the movable monitor tilted downward.

FIG. 4 shows a state where the movable monitor 20 is tilted downward about an axis extending in the leftward and rightward directions. The movable monitor 20 is tilted downward with the contact portion between the lower side portion 22b (the flange 23g) and the lower edge wall 30b serving as a fulcrum by pulling the upper side portion 22a of the movable monitor 20 rearwardly. In this tilting operation, each of the upper left support rod 19a and the upper right support rod 19c increases the rising angle (projecting amount) thereof relative to the monitor accommodating portion 30 while moving the associated spherical end 25 toward the inner end (the inner end wall 35d) of the associated guide groove 31a or 31c from a portion of this guide groove in the vicinity of the outer end (the outer end wall 35c) thereof, thereby pushing the upper left socket 27a and the upper right socket 27c rearward to tilt the movable monitor 20 downward. FIG. 4 shows a state where the movable monitor 20 is tilted downward to a maximum angle by pulling the upper left support rod 19a and the upper right support rod 19c. In this state, the spherical ends 25 of the upper left support rod 19a and the upper right support rod 19c are positioned in the vicinity of the inner ends of the guide grooves 31a and 31c, respectively, and are prevented from moving further diagonally inwards by the associated end walls 35d. Additionally, the rising angles of the lower left support rod 19b and the lower right support rod 19d relative to the monitor accommodating portion 30 are smaller than those of the upper left support rod 19a and the upper right support rod 19c, and the spherical end 25 of each of the lower left support rod 19b and the lower right support rod 19d sits in the associated guide groove 31b or 31d at an approximate center in the longitudinal direction thereof.

FIG. 5 shows a state where the movable monitor 20 is tilted upward about an axis extending in the leftward and rightward directions. The movable monitor 20 is tilted upward with the contact portion between the upper side portion 22a and the upper edge wall 30a serving as a fulcrum by pulling the lower side portion 22b (the flange 23g) of the movable monitor 20 rearwardly. In this tilting operation, each of the lower left support rod 19b and the lower right support rod 19d increases the rising angle (projecting amount) thereof relative to the monitor accommodating portion 30 while moving the associated spherical end 25 toward the inner end (the inner end wall 35d) of the associated guide groove 31b or 31d from a portion of this guide groove in the vicinity of the outer end (the outer end wall 35c) thereof, thereby pushing the lower left socket 27b and the lower right socket 27d rearward to tilt the movable monitor 20 upward. FIG. 5 shows a state where the movable monitor 20 is tilted upward to a maximum angle by pulling the lower left support rod 19b and the lower right support rod 19d. In this state, the spherical ends 25 of the lower left support rod 19b and the lower right support rod 19d are positioned in the vicinity of the inner ends of the guide grooves 31b and 31d, respectively, and area prevented from moving further diagonally inwards by the associated end walls 35d. Additionally, the rising angles of the upper left support rod 19a and the upper right support rod 19c relative to the monitor accommodating portion 30 are smaller than those of the lower left support rod 19b and the lower right support rod 19d, respectively, and the spherical end 25 of each of the upper left support rod 19a and the upper right support rod 19c sits in the associated guide groove 31a or 31c at an approximate center in the longitudinal direction thereof.

When the movable monitor 20 is in the initial position shown in FIG. 1 (i.e., in a state of being accommodated in the monitor accommodating portion 30), the movable monitor 20 is surrounded by the upper edge wall 30a, the lower edge wall 30b, the left edge wall 30c and the right edge wall 30d, which are formed on the periphery of the monitor accommodating portion 30, thereby preventing and protecting the movable monitor 20 from getting externally caught so that the movable monitor 20 is not accidentally moved. The low wall 30i, which is formed at the upper end of the right edge wall 30d (at the border between the right edge wall 30d and the upper edge wall 30a), improves the operability of the control dial 50 (which is positioned to the upper right of the movable monitor 20) and the plurality of control buttons 51, which are positioned below the control button 50. Specifically, when the user holds the grip of the camera body 10 with the right hand, it is assumed that the control dial 50 and the push buttons (including the control buttons 51) provided around the control dial 50 are operated by the thumb of the right hand. In this operation, the low wall 30i sits on the moving path of the thumb of the right hand, which allows this thumb to be capable of reaching the control dial 50 smoothly without getting caught by the relatively high walls (30a, 30b, 30c and 30d) which surround the monitor accommodating portion 30.

When the movable monitor 20 is in the initial position, the movable monitor 20 can be protected by the upper edge wall 30a, the lower edge wall 30b, the left edge wall 30c and the right edge wall 30d, which are provided at positions surrounding the four corners (the upper left corner, the upper right corner, the lower left corner and the lower right corner) of the movable monitor 20 as described above. On the other hand, the rim of the movable monitor 20 is partly exposed by the formation of the recesses 30e, 30f, 30g and 30h on the periphery of the monitor accommodating portion 30 to thereby achieve an easier operability of the movable monitor 20 (making it easier to grip the movable monitor 20 with fingers) from the initial position thereof when the movable monitor 20 is tilted from the initial position as shown in FIGS. 2 through 5. Since the recesses 30e, 30f, 30g and 30h are formed to correspond to the center portions of the associated side portions 22a, 22b, 22c and 22d, respectively, of the movable monitor 20, it is easy to apply a manual force on the movable monitor 20 to tilt the movable monitor 20 in any of the upward, downward, leftward and rightward directions from the initial position.

Although FIGS. 2 through 5 each show a state where the movable monitor 20 (together with the base plate 23) is tilted upward, downward, leftward or rightward to a maximum angle by manually moving the movable monitor 20 in a manner to make two of the four support rods 19a, 19b, 19c and 19d become maximum in the rising angle relative to the monitor accommodating portion 30, it is also possible to hold the movable monitor 20 at any arbitrary angle smaller than the maximum angle by positioning the spherical end 25 of each of at least two of the four support rods 19a, 19b, 19c and 19d at an intermediate position between the inner end and the outer end of the associated guide groove 31. The spherical end 25 of each support rod 19a, 19b, 19c and 19d is engaged in the associated guide groove 31a, 31b, 31c or 31d with friction which is produced by the spherical end 25 being held by the associated internal guide 34 applied to the spherical end 25, and the movable monitor 20 can be held at the aforementioned arbitrary angle by stopping the tilting operation of the movable monitor 20 on its way to the maximum angle. The maximum tilt angles of the movable monitor 20 in the leftward, rightward, downward and upward directions can be modified to angles greater or smaller than the angles of the movable monitor 20 shown in FIGS. 2 through 5, respectively, by changing the settings such as the lengths of the support rods 19a, 19b, 19c and 19d and the lengths of the guide grooves 31a, 31b, 31c and 31d.

The upward angle of the movable monitor 20 can further be increased by rotating the support frame 22 about the pins 22x relative to the base plate 23 as shown in FIGS. 6 and 21. For instance, in the state shown in FIG. 5, the entire movable monitor 20 is angled (rotated) upward at approximately 40 degrees relative to the camera body 10 by the aforementioned tilting operation (first-stage tilting operation) that is performed via the four support rods 19a, 19b, 19c and 19d. Additionally, in the state shown in FIGS. 6 and 21, each of the display 21 and the support frame 22, which are fixed to each other, has been angled upward at approximately 90 degrees relative to the initial position that is shown in FIG. 1 by an additional tilting operation of the support frame 22 with respect to the base plate 23 (second-stage tilting operation). This second-stage tilting operation makes it possible to use the movable monitor 20 as like a waist-level finder. The rotation of the support frame 22 from the state shown in FIG. 5 to the state shown in FIGS. 6 and 21 can be carried out manually with fingers placed on portions of the support frame 22 which are not covered by the flanges 22g, 23h and 23i of the base plate 23. As described above, the support frame 22 and the base plate 23 are slightly caught and held by the two click washers 38 at the above described two engaging positions (click-stop positions): the integral position (shown in FIGS. 1 through 5, 7 through 13 and 20) and the raised position (shown in FIGS. 6 and 21), and applying predetermined force to the support frame 22 causes the holding of the support frame 22 by the click washers 38 to be released, which allows the support frame 22 to be tilted (rotated) about the pins 22x.

When the movable monitor 20 is positioned close to the camera body 10 and accommodated in the monitor accommodating portion 30 (i.e., when the movable monitor 20 is in the initial position), the movable monitor 20 can be tilted about any of the axes extending in specific directions such as the upward and downward directions and the leftward and rightward directions as described above. This tilting of the movable monitor 20 shall be herein referred to as a first way of tilting. In addition to the first way of tilting, the movable monitor 20 can be pulled out from the monitor accommodating portion 30 rearwardly in the optical axis direction (in a direction along the imaginary line O' that is extended from the optical axis O) to be spaced from the camera body 10 as shown in FIGS. 7, 11, 12 and 13. This pull-out operation of the movable monitor 20 is performed by increasing the rising angles (projecting amounts) of the four support rods 19a, 19b, 19c and 19d relative to the monitor accommodating portion 30. For instance, the movable monitor 20 can be brought into the state shown in FIGS. 7, 11, 12 and 13 by moving the movable monitor 20 substantially parallel to itself along the optical axis O, i.e., moving the movable monitor 20 without tilting the movable monitor 20 (while maintaining the reference angle thereof), from the initial position (shown in FIGS. 1 and 20) so that the four support rods 19a, 19b, 19c and 19d project by substantially the same amount from the monitor accommodating portion 30.

FIGS. 7, 11, 12 and 13 show a state (fully projected (pulled) state of the movable monitor 20) where the rearwardly projecting amount (the rising angle) of each support rod 19a, 19b, 19c and 19d from the monitor accommodating portion 30 is maximum. In this state, the spherical end 25 of each support rod 19a, 19b, 19c and 19d is prevented from further moving in the associated guide groove 31a, 31b, 31c or 31d toward the inner end thereof by the associated inner end wall 35d. Therefore, the four support rods 19a, 19b, 19c and 19d extend against one another, thus being prevented from further increasing the rising angles thereof, so that the movable monitor 20 is positioned at the forward projecting limit. The distances between the inner end walls 35d of the four guide walls 31a, 31b, 31c and 31d that are provided on the camera body 10 side, are set greater than the distances between the four sockets 27a, 27b, 27c and 27d that are provided on the movable monitor 20 side, and accordingly, when the movable monitor 20 is in the fully projected state, the four support rods 19a, 19b, 19c and 19d support the movable monitor 20 in a spreading (flare) shape (trapezoidal shape) with the distances between the four support rods 19a, 19b, 19c and 19d on the spherical ends 25 side being greater than those on the spherical ends 26 side. This achieves stable support for the movable monitor 20. In addition, pressing the movable monitor 20 in the fully projected state forward, toward the camera body 10, applies force to the four support rods 19a, 19b, 19c and 19d in directions to move the spherical ends 25 thereof away from the inner end walls 35d in the four guide grooves 31a, 31b, 31c and 31d, which makes it possible to allow the movable monitor 20 to move so that it is smoothly accommodated in the monitor accommodating portion 30.

In a state where the movable monitor 20 is rearwardly pulled away from the monitor accommodating portion 30 to be spaced from the camera body 10, the movable monitor 20 can move without being restricted by the upper edge wall 30a, the lower edge wall 30b, the left edge wall 30c and the right edge wall 30d of the monitor accommodating portion 30. Accordingly, the movable monitor 20 can be freely tilted in any arbitrary direction, i.e., without the tilting operation of the movable monitor 20 being limited by rotation axes in specific directions such as the upward and downward directions and the leftward and rightward directions as shown in FIGS. 2 through 6. For instance, the movable monitor 20 can be tilted in directions such as the upper right direction shown in FIG. 8, the lower left direction shown in FIG. 9, the upper left direction that is laterally opposite in direction to the direction shown in FIG. 8 and the lower right direction that is laterally opposite in direction to the direction shown in FIG. 9, and the tilt angle of the movable monitor 20 can be arbitrarily set within a range in which each of the four support rods 19a, 19b, 19c and 19d can follow. This tilting of the movable monitor 20 that is flexible in tilting direction shall be herein referred to as a second way of tilting. Additionally, it is also possible to move the movable monitor 20 in directions orthogonal to the optical axis O while maintaining the reference angle within a predetermined range in which each of the four support rods 19a, 19b, 19c and 19d can follow in a state where the movable monitor 20 is pulled out rearwardly by an amount smaller than the maximum amount.

Figure 10:
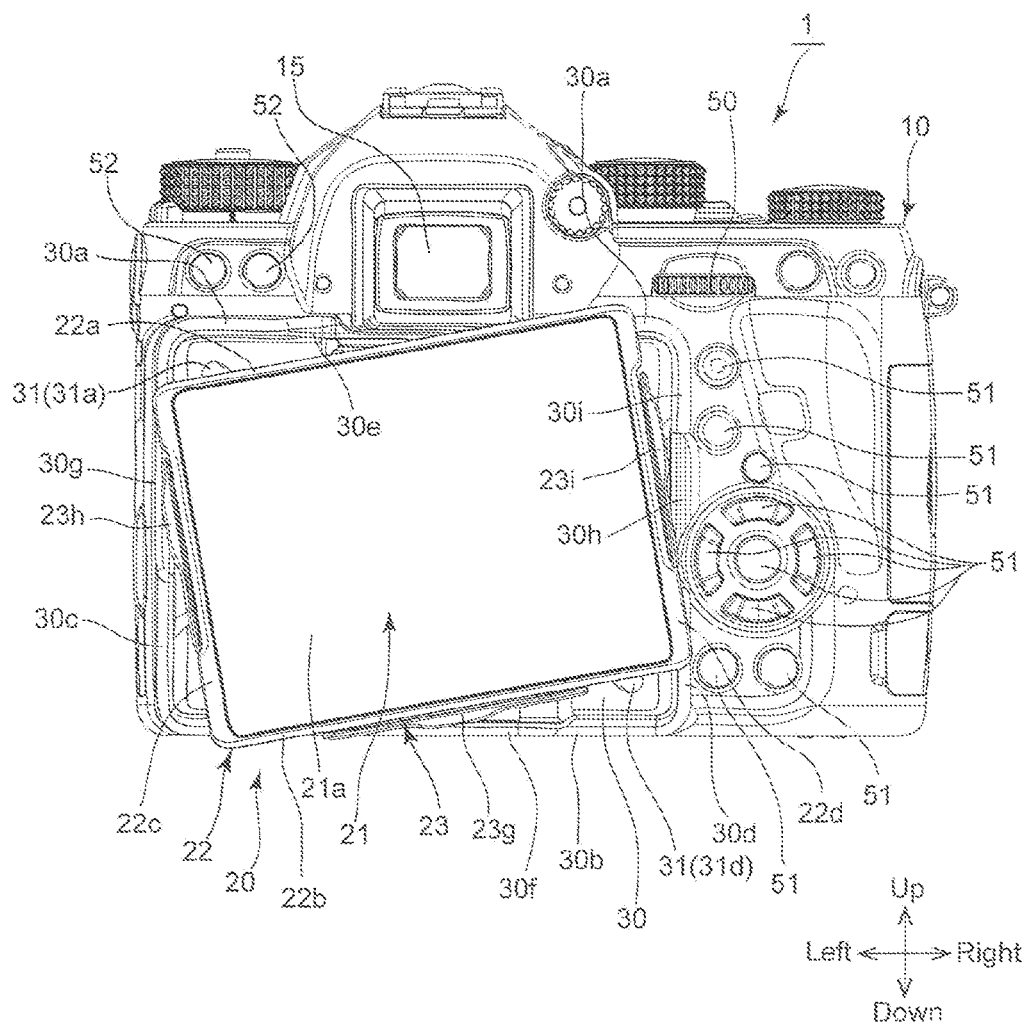
FIG. 10 is a rear elevational view of the SLR camera with the movable monitor rotated (counterclockwise with respect to FIG. 10) about an axis (imaginary line) extended from the optical axis of an interchangeable lens mounted to the camera body.

In a state where the movable monitor 20 is pulled out rearwardly from the monitor accommodating portion 30, the movable monitor 20 can also be rotated about the imaginary line O' (an axis extending in a direction in which the movable monitor 20 can move toward and away from the camera body 10), which is extended from the optical axis O, within a range in which each of the four support rods 19a, 19b, 19c and 19d can follow as shown in FIG. 10. FIG. 10 shows a state where the movable monitor 20 is rotated counterclockwise as viewed from the user's side (i.e., as viewed from the rear of the camera 1). The movable monitor 20 can also be rotated in the opposite rotation direction, i.e., clockwise as viewed from the user's side. Since the center (with respect to the outer profile) of the movable monitor 20 substantially lies on the imaginary line O', which is extended from the optical axis O, a configuration in which the imaginary line O', which is extended from the optical axis O, passes through a point that is off-center from said center of the movable monitor 20 is also possible. In such a case, the center of the outer shape of the movable monitor 20 is not coincident with the rotation center of the movable monitor 20.

The flexible board 18 has a sufficient length allowing the movable monitor 20 to follow all the above illustrated movements thereof. As described above, the flexible board 18 is structured such that the second section 18d, which is provided between the board insertion hole 43 of the camera body 10 and the narrowed portion 46a of the base plate 23, and the fourth section 18f, which is provided between the upper end opening 45a of the base plate 23 and the board insertion hole 47 of the support frame 22, are deformable sections that flexibly deform in accordance with movement of the movable monitor 20. Of these deformable sections, the relative position between the board insertion hole 43 and the narrowed portion 46a, which are positioned at respective ends of the second section 18d, in particular, varies greatly. For instance, FIG. 21 shows a state where the lower side portion (the flange 23g) of the base plate 23 is pulled out rearwardly, so that the narrowed portion 46a is largely spaced rearward from the board insertion hole 43. In this state, the second section 18d of the flexible board 18 and the board cover 57 do not linearly connect the board insertion hole 43 and the narrowed portion 46a and has a sufficient length, extending obliquely downward and subsequently obliquely upward, thereby being shaped into a letter V as shown in FIG. 21. Therefore, in addition to the state as shown in FIG. 21 in which the movable monitor 20 is pulled up from the base plate 23, even in the fully projected state (shown in FIGS. 7, 11, 12 and 13) where the movable monitor 20 is fully pulled out rearwardly or the tilted/rotated state (shown in FIG. 8, 9 or 10) where the movable monitor 20 is tilted or rotated after being pulled out rearwardly, the second section 18d of the flexible board 18 and the board cover 57 can connect the camera body 10 and the movable monitor 20 (the base plate 23) with a sufficient length.

Figure 8:
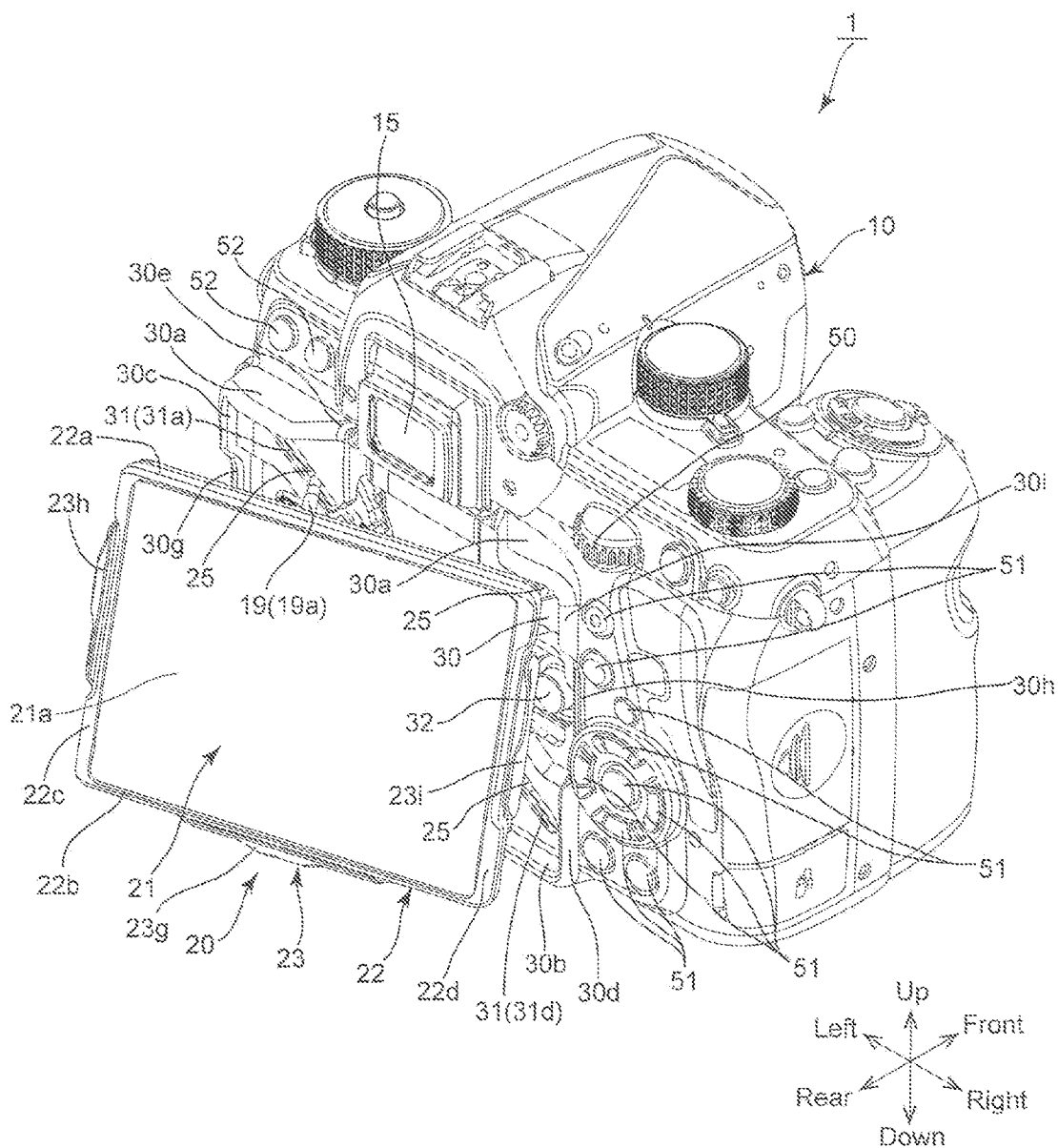
FIG. 8 is a rear perspective view of the SLR camera with the movable monitor tilted diagonally to the upper right.
Figure 9:
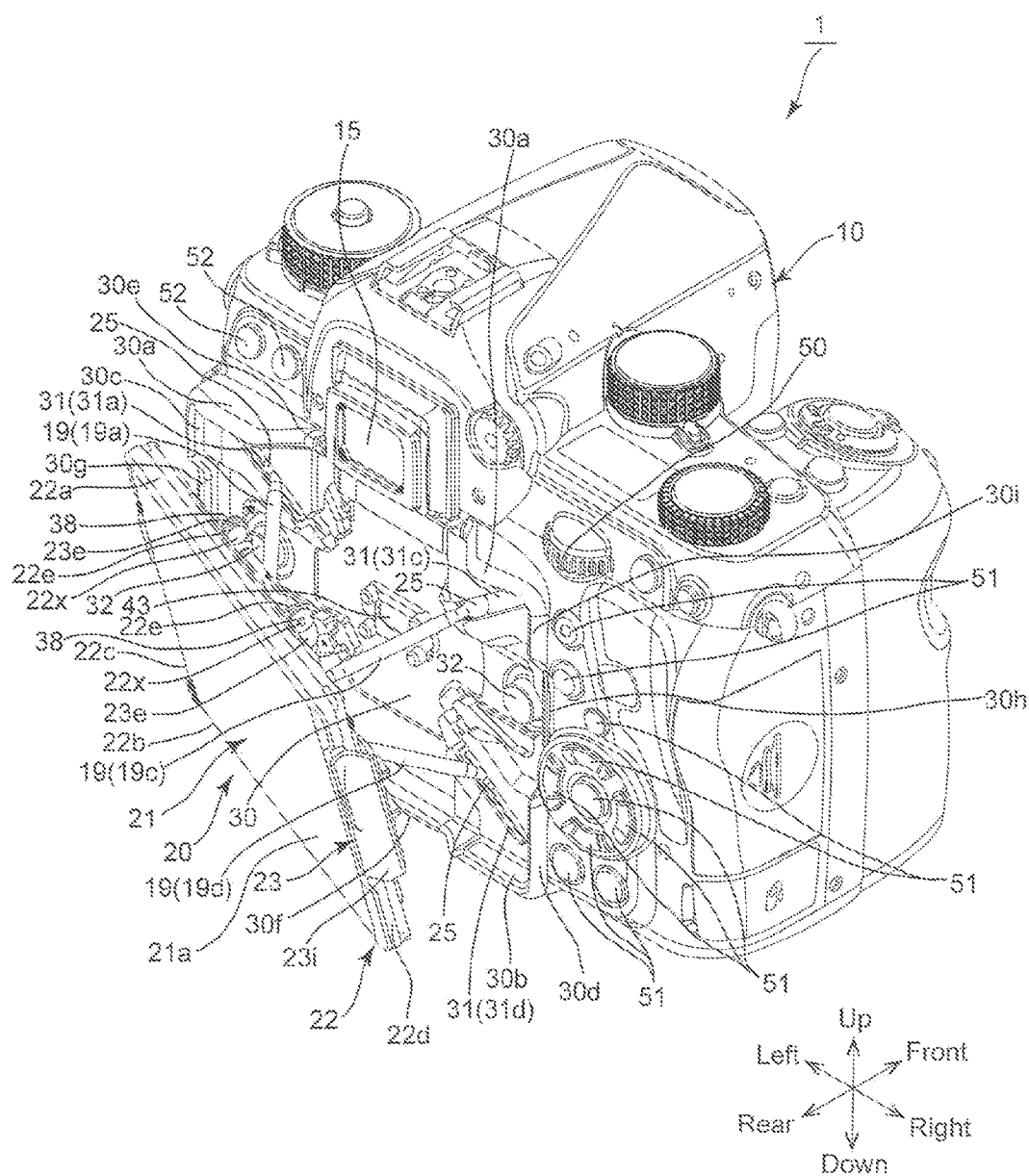
FIG. 9 is a rear perspective view of the SLR camera with the movable monitor tilted diagonally to the lower left.

The board insertion hole 43, which is provided on the camera body 10 side, is positioned at substantially equal distances from the four guide grooves 31a, 31b, 31c and 31d (see FIG. 12), the narrowed portion 46a, which is provided on the movable monitor 20 side, is positioned at substantially equal distances from the four sockets 27a, 27b, 27c and 27d, and each of the board insertion hole 43 and the narrowed portion 46a is arranged in the vicinity of the center of the outer shape of the movable monitor 20 (in the vicinity of the imaginary line O' that is extended from the optical axis O) (see FIG. 20). When the movable monitor 20 is tilted or rotated with the movable monitor 20 pulled out as shown in FIGS. 8 through 10, the amount of displacement of the movable monitor 20 with respect to the monitor accommodating portion 30 is minimum in the vicinity of the center of the outer shape of the movable monitor 20. In addition, the amount of displacement of the movable monitor 20 with respect to the monitor accommodating portion 30 is equal in the vicinity of the center of the outer shape of the movable monitor 20 when the movable monitor 20 is tilted in up, down, left and right as shown in FIGS. 2 through 5, and there exists no tilting direction in which the amount of displacement of the movable monitor 20 with respect to the monitor accommodating portion 30 becomes excessively great. Accordingly, the positioning of the board insertion hole 43 and the narrowed portion 46a at positions where the amount of displacement of the movable monitor 20 with respect to the monitor accommodating portion 30 is small achieves the effect of reducing flexure and twist of the second section 18d of the flexible board 18 and the board cover 57, which are provided to extend between the board insertion hole 43 and the narrowed portion 46a.

When the support frame 22 rotates relative to the base plate 23 about the pins 22x as shown in FIGS. 20 and 21, the position of the board insertion hole 47 of the support frame 22 with respect to the upper end opening 45 of the base plate 23 varies. Specifically, when the movable monitor 20 is in the initial position as shown in FIG. 20, the board insertion hole 47 of the support frame 22, which is open forward, is positioned relative to the upper end opening 45a, which is open upwardly, to be displaced from the upper end opening 45a by an angle of approximately 90 degrees in the rotation direction about the pins 22x. On the other hand, in a state where the support frame 22 is fully rotated upward (pulled up) relative to the base plate 23 as shown in FIG. 21, the board insertion hole 47 is open downwardly while the upper end opening 45a is open obliquely upward, and the relative angle between the upper end opening 45a and the board insertion hole 47 in the rotation direction about the pins 22x becomes greater. However, since both the upper end opening 45a and the board insertion hole 47 are arranged and formed at positions radially close to the axis of the pins 22x, relative rotation between the support frame 22 and the base plate 23 causes little change in distance between the upper end opening 45a and the board insertion hole 47. In addition, no complicated movements other than relative rotations about the pins 22x are performed between the support frame 22 and the base plate 23. Accordingly, setting the fourth section 18f of the flexible board 18 so that it linearly connects the upper end opening 45a and the board insertion hole 47 makes the fourth section 18f have just enough length. The fourth section 18f of the flexible board 18 is shorter in length (smaller in amount of outward exposure) and smaller in amount of deformation than the second section 18d of the flexible board 18, and hence, is not sheathed with a protection member like the board cover 57, unlike the first section 18c. However, it is possible that the fourth section 18f of the flexible board 18 be sheathed with a protection member like the board cover 57. Alternatively, it is also possible that the portion of the flexible board 18 which extends from the board insertion hole 93 that is formed on the camera body 10 side to the board insertion hole 47 of the movable monitor 20 (i.e., the second section 18d, the third section 18e and the fourth section 18f of the flexible board 18) be fully and collectively sheathed with the board cover 57.

As described above, in the present embodiment of the camera 1, the flexibility in setting the position of the movable monitor 20 relative to the camera body 10 is high. When the movable monitor 20 is in the initial position, in which the movable monitor 20 is accommodated in the monitor accommodating portion 30, the movable monitor 20 can be tilted in four directions: up, down, left and right, as the aforementioned first way of tilting. In a state where the movable monitor 20 has been moved rearwardly in the optical axis direction from the initial position (in a direction away from the camera body 10), the movable monitor 20 can be freely tilted with no restrictions on rotation direction as the aforementioned second way of tilting. Unlike the first way of tilting, in the second way of tilting, the tilting direction of the movable monitor 20 can be changed directly from an arbitrary tilting direction to a subsequent arbitrary tilting direction rather than via the reference angle, at which the display screen 21a of the display 21 of the movable monitor 20 is substantially orthogonal to the optical axis O (the imaginary line O'), thus the movable monitor 20 being superior in operability. In either of the first and second ways of tilting, when the movable monitor 20 is tilted, the movable monitor 20 substantially remains within a range not protruding from the outer profile of the camera body 10 as viewed in the direction of the optical axis O (the optical axis direction) as shown in FIG. 10, which makes it possible to prevent an increase in size of the camera 1 (specifically in the upward, downward, leftward and rightward directions that are orthogonal directions to the optical axis O).

In addition, the angle of the movable monitor 20 can be increased in a predetermined direction (specifically the upward direction in the present embodiment of the camera) by rotating the support frame 22 relative to the base plate 23 to thereby be capable of dealing with a larger variety of picture taking postures.

Additionally, if the movable monitor 20 is moved rearward in the optical axis direction (in a direction away from the camera body 10) from the initial position, the movable monitor 20 can rotate about the optical axis O as shown in FIG. 10, which increases the flexibility in setting the position of the movable monitor 20 relative to the camera body 10.

Each of the above described tilting and rotation of the movable monitor 20, except the tilting (rotation) of the movable monitor 20 shown in FIG. 6, is performed without substantially changing the relative positional relationship between the center of the outer profile of the movable monitor 20 and the optical axis O (the imaginary line O' extending from the optical axis O), and the movable monitor 20 does not largely deviate from the outer profile of the camera body 10 as viewed along the optical axis O, thereby facilitating a photographic operation such as an operation to determine the composition. In addition, since the movable monitor 20 is accommodated in the monitor accommodating portion 30 when in the initial position, and is pulled out as needed, the size of the camera 1 in the optical axis direction when the movable monitor 20 is in the initial position can be minimized.

In the present embodiment of the camera 1, the movable monitor 20 is supported to be movable relative to the camera body 10 via a plurality of support rods (the four support rods 19) of the support mechanism (31, 27 and 19). Each support rod 19 is provided at respective ends thereof with the spherical ends 25 and 26, and the spherical end 26 of each support rod 19 is supported by the associated socket 27, which is provided on the movable monitor 20 side, to be capable of rotating about the spherical center of the spherical end 26 (rotatable with no restrictions on rotational direction) relative to the associated socket 27 while the spherical end 25 of each support rod 19 is supported by the associated guide groove 31, which is provided on the camera body 10 side, to be capable of rotating about the spherical center of the spherical end and moving linearly relative to the associated guide groove 31, which makes the above described highly flexible movements of the movable monitor 20 possible. When the movable monitor 20 is in the initial position, the rising angle (projecting amount) of each support rod 19 relative to the monitor accommodating portion 30 is at a minimum, thereby establishing the positional relationship between the four support rods 19 such that all the support rods 19 lie on a plane substantially orthogonal to the imaginary plane O' that is extended from the optical axis O. Since each socket 27 and the associated guide groove 31 also lie on this orthogonal plane, the support mechanism for the movable monitor 20 can be accommodated in a highly space-saving manner in the forward and rearward directions, along which the optical axis O extends.

The number and the arrangement of the support rods 19 can be changed according to specifications required. The above illustrated embodiment of the camera 1 is structured such that the four guide grooves 31*a*, 31*b*, 31*c* and 31*d*, which are formed to extend in the directions of the two diagonal lines of the rectangular movable monitor 20, support the four support rods 19*a*, 19*b*, 19*c* and 19*d* in accordance with the demanded specifications for tilting the rectangular movable monitor 20 (the four sides of which face upward, downward, leftward and rightward, in four directions: up, down, left and right when in the initial position) from the initial position (as shown in FIGS. 2 through 5). This structure makes it easy for the user to tilt the movable monitor 20 in four directions of up, down, left and right, each direction of which is defined between adjacent two of the four support rods 19. In addition, since the support mechanism for the movable monitor 20 is configured so that each guide groove 31*a*, 31*b*, 31*c* and 31*d* extends in a diagonal direction of the rectangular movable monitor 20, each guide groove 31*a*, 31*b*, 31*c* and 31*d* and each support rod 19*a*, 19*b*, 19*c* and 19*d* can be made as long in length as possible within a limited space, i.e., within the range defined by the outer profile of the movable monitor 20. If such components (19 and 31) of the support mechanism are lengthened, the range of movement of the movable monitor 20 increases, thereby increasing the flexibility in setting the position of the movable monitor 20 relative to the camera body 10.

Basically, if the number of the support rods 19 is increased, the stability of the movable monitor 20 is improved, whereas the flexibility in movement of the movable monitor 20 tends to be restricted. On the other hand, if the number of the support rods 19 is decreased, the flexibility in movement of the movable monitor 20 is increased, whereas the stability of the movable monitor 20 becomes difficult to achieve. For instance, in the case where one or more additional support rod 19 is installed and arranged in between the four support rods 19*a*, 19*b*, 19*c* and 19*d*, the effect of improving the stability of the movable monitor 20 when the movable monitor 20 moves relative to the monitor accommodating portion 30 is obtained. On the other hand, when the movable monitor 20 is tilted upward, downward, leftward and rightward from the initial position as shown in FIGS. 2 through 5, there is a possibility of the tilting amount and direction of the movable monitor 20 being restricted by the additional support rod(s) 19 depending on conditions such as the arrangement of the sockets 27. In addition, in the case where the number of the support rods 19 is decreased by removing one of the four support rods 19*a*, 19*b*, 19*c* and 19*d* of the above illustrated embodiment of the camera 1, the tilting amount of the movable monitor 20 toward the position of the removed support rod 19 can be increased. However, since the friction of the guide groove 31 and the socket 27 which acts on the removed support rod 19 is reduced, to achieve stability of the movable monitor 20 which is equivalent to that achieved in the above illustrated embodiment of the camera 1, it is required to take measures such as, e.g., enhancing the friction which acts on the remaining support rods 19. In either case, the effect of achieving both high flexibility in movement of the movable monitor 20 and downsizing of the support mechanism for the movable monitor 20 is obtained compared with existing support mechanisms, and accordingly, the present invention can also be embodied as such a modified embodiment so long as this modified embodiment satisfies the specifications required for the support and movements of the movable monitor 20.

Additionally, the operability of the movable monitor 20 when the movable monitor 20 is manually moved is influenced by the rising angle (projecting amount) of each support rod 19*a*, 19*b*, 19*c* and 19*d* relative to the associated guide groove 31*a*, 31*b*, 31*c* or 31*d*. When the user changes the orientation of the movable monitor 20 with his or her hand holding the support frame 22 and/or the base plate 23, force is input to each support rod 19*a*, 19*b*, 19*c* and 19*d* from the associated socket 27*a*, 27*b*, 27*c* or 27*d*, which is positioned on the movable monitor 20 side, via the associated spherical end 26 to change the orientation of the movable monitor 20 while making the spherical end 25 of each support rod 19 slide in the associated guide groove 31*a*, 31*b*, 31*c* or 31*d* against friction. At this time, when the movable monitor 20 is in a position (e.g., the initial position that is shown in FIGS. 1 and 20) in which the rising angle of each support rod 19*a*, 19*b*, 19*c* and 19*d* is small, the direction of the axis of each support rod 19*a*, 19*b*, 19*c* and 19*d* is close to the longitudinal direction of the associated guide groove 31*a*, 31*b*, 31*c* or 31*d* (the inclination of each support rod 19*a*, 19*b*, 19*c* and 19*d* relative to the associated guide groove 31*a*, 31*b*, 31*c* or 31*d* is small), and accordingly, most of the pushing/pulling force which acts on the spherical end 25 of each support rod 19 from the spherical end 26 thereof via the associated rod-shaped portion 24 acts as a component of force which moves the spherical end 25 along the associated guide groove 31*a*, 31*b*, 31*c* or 31*d*. Accordingly, the movable monitor 20 can be moved with efficiency. On the other hand, the difference in angle between the direction of the pushing/pulling force which acts on the spherical end 25 of each support rod 19 from the spherical end 26 thereof via the associated rod-shaped portion 24 and the moving direction of the spherical end 25 of each support rod 19 along the associated guide groove 31*a*, 31*b*, 31*c* or 31*d* increases as the rising angle of each support rod 19*a*, 19*b*, 19*c* and 19*d* increases, so that the component of force which makes the spherical end 25 slide upon force being input to the associated spherical end 26 decreases. Hence, if priority (importance) is given to the operability of the movable monitor 20, the support mechanism for the movable monitor 20 can be modified such that the maximum rising angle of each support rod 19*a*, 19*b*, 19*c* and 19*d* is restricted to some extent by setting conditions such as the length of each guide groove 31*a*, 31*b*, 31*c* and 31*d* and the arrangement of each socket 19*a*, 19*b*, 19*c* and 19*d*. On the other hand, if the maximum rising angle of each support rod 19*a*, 19*b*, 19*c* and 19*d* is reduced, the projecting amount of the movable monitor 20 from the monitor accommodating portion 30 and the tilt angle of the movable monitor 20 are restricted; accordingly, if priority (importance) is given to the range of movement of the movable monitor 20, the support mechanism for the movable monitor 20 can also be set to an increased maximum rising angle of each support rod 19a, 19b, 19c and 19d. In the present embodiment of the camera 1, the support mechanism for the movable monitor 20 is structured so that the direction of the axis of the rod-shaped portion 24 of each support rod 19a, 19b, 19c and 19d set so that the maximum rising angle is not perfectly normal (orthogonal) to the longitudinal direction of the associated guide groove 31a, 31b, 31c or 31d, i.e., so that the direction of the axis of the rod-shaped portion 24 of each support rod 19a, 19b, 19c and 19d set at the maximum rising angle is slightly inclined to the imaginary line O' (see FIGS. 11, 20 and 21) that is extended from the optical axis O, which strikes a balance between the operability of the movable monitor 20 and the magnitude of the range of movement of the movable monitor 20.

The flexible board 18 that electrically connects the body-side circuit board 17, which is provided in the camera body 10, and the monitor circuit board 55, which is provided in the movable monitor 20, is extended to the outside of the camera body 10 through the board insertion hole 43, supported by the base plate 23 at an intermediate portion (the third section 18e) of the flexible board 18, and subsequently is inserted into the board accommodating space 48 in the support frame 22. The routing of the flexible board 18 in such a manner makes it possible to achieve a space-saving structure which increases the flexibility in position of the display 21 relative to the camera body 10 and reduces loads on the flexible board 18.

For instance, if the support mechanism for the flexible board 18 is modified such that the support by the base plate 23 is omitted and that the flexible board 18 is routed directly from the board insertion hole 43 to the board insertion hole 47, there is a possibility of a heavy load being applied to portions of the flexible board 18 which are inserted into the board insertion holes 43 and 47 as a result of a drastic variation in bending angle or amount of twist of the inserted portions of the flexible board 18 due to highly-flexible variations in orientation of the display 21 and the support frame 22 relative to the camera body 10. To prevent this problem from occurring, if the length of the flexible board 18 is increased between the board insertion holes 43 and 47, the slackening state of the flexible board 18 becomes difficult to control, so that there is a possibility of the following problem(s) occurring when the movable monitor 20 is accommodated in the monitor accommodating portion 30: the flexible board 18 may interfere with an element(s) of the support mechanism for the movable monitor 20 such as the support rods 19; and the flexible board 18 may get unintentionally caught on a component(s).

Whereas, in the present embodiment of the camera 1, the third section 18e of the flexible board 18 is supported alongside the base plate 23, the length and the slackening state are set independently for each of the second section 18d (provided between the camera body 10 and the base plate 23) and the fourth section 18f (provided between the base plate 23 and the support frame 22 (the display 21)), and accordingly, the flexible board 18 can be arranged in a manner to have just enough appropriate length and shape corresponding to movements of the base plate 23 and the support frame 22. Due to the above described arrangement of the second section 18d of the flexible board 18 in a manner to connect the board insertion hole 43 and the narrowed portion 46a, which are positioned in the vicinity of the centers of the outer shapes of the monitor accommodating portion 30 and the movable monitor 20, variations of the moving direction of the base plate 23 do not easily cause a difference in deformation of the flexible board 18 when the base plate 23 (which serves as a first support stage portion that has a high degree of flexibility in setting the position thereof relative to the camera body 10) moves, which makes it possible to reduce uneven distribution of load on the flexible board 18. Additionally, since the fourth section 18f of the flexible board 18 is positioned between the upper end opening 45a and the board insertion hole 47 in the space between the base plate 23 and the support frame 22, which are provided on one of the four sides of the substantially rectangular movable monitor 20 where the base plate 23 and the support frame 22 are connected via the pins 22x, the flexible board 18 can be accommodated within the minimum length corresponding to the tilting of the support frame 22 relative to the base plate 23 about the pins 22x, so that no excessive slack occurs in the flexible board 18. In addition, since the second section 18d of the flexible board 18 has a shape which is folded upward after the third section 18e (which is supported by the base plate 23) is extended downward, the positional relationship between the second section 18d, the third section 18e and the fourth section 18f of the flexible board 18 is such that the second section 18d, the third section 18e and the fourth section 18f of the flexible board 18 are substantially aligned in the upward and downward directions of the base plate 23 when the movable monitor 20 is accommodated in the monitor accommodating portion 30 as shown in FIG. 20, which makes it possible to space efficiently accommodate the flexible board 18 in between the movable monitor 20 and the camera body 10.

The support mechanism for the movable monitor 20, which supports the movable monitor 20 in a manner to allow the movable monitor 20 to move relative to the camera body 10, is configured of the four guide grooves 31a, 31b, 31c and 31d, which extend in the diagonal directions of the substantially rectangular monitor accommodating portion 30, the four sockets 27a, 27b, 27c and 27d, which are provided on the movable monitor 20 side so as to face points in the vicinity of the inner ends of the four guide grooves 31a, 31b, 31c and 31d, respectively, and the four support rods 19a, 19b, 19c and 19d, which connect the four sockets 27a, 27b, 27c and 27d and the four support rods 19a, 19b, 19c and 19d. Accordingly, the members of the support mechanism for the movable monitor 20 are arranged in areas along the diagonal lines of the movable monitor 20 and the monitor accommodating portion 30. The board insertion hole 43, which determines the position of one end of the second section 18d of the flexible board 18, is located at a position surrounded by the inner ends (the inner end walls 35d) of the four guide grooves 31a, 31b, 31c and 31d, while the narrowed portion 46a, which determines the other end of the second section 18d of the flexible board 18, is located at a position (in the vicinity of the center of the outer shape of the movable monitor 20) surrounded by the four sockets 27a, 27b, 27c and 27d. In addition, the board accommodating recess 44 that accommodates the second section 18d of the flexible board 18 extends in the upward and downward directions in through the area between the sockets 27b and 27d (see FIGS. 14 and 15). Accordingly, the second section 18d of the flexible board 18 is positioned in the space between a combination of the lower left socket 27b, the lower left guide groove 31b and the lower left support rod 19b, and a combination of the lower right socket 27d, the lower right guide groove 31d and the lower right support rod 19d of the support mechanism for the movable monitor 20. The board guiding recess 45 and the communication path 46, which support the third section 18e of the flexible board 18, extend in the upward and downward directions through the area between the sockets 27a and 27c (see FIGS. 14 and 15). Accordingly, the third section 18e of the flexible board 18 is positioned in the space between a combination of the upper left socket 27a, the upper left guide groove 31a and the upper left support rod 19a, and a combination of the upper right socket 27c, the upper right guide groove 31c and the upper right support rod 19c of the support mechanism for the movable monitor 20. As described above, the flexible board 18 connects the camera body 10 and the movable monitor 20 through a space in between the above-described areas while avoiding the areas on the diagonal lines of the movable monitor 20 and the monitor accommodating portion 30 in which the support mechanism for the movable monitor 20 is arranged, so that the support mechanism for the movable monitor 20 and the flexible board 18 are accommodated in the monitor accommodating portion 30 without interfering with each other; hence, this structure is superior in space efficiency.

In addition, the sheathing of the second section 18d of the flexible board 18 with the board cover 57 protects the second section 18d of the flexible board 18 from damage even if peripheral members come in contact with the board cover 57, thus being capable of reducing the risk of damage to the second section 18d such as wire breakage in the second section 18d. The board cover 57 also serves as an element of the weather-proof (watertight) structure around the board insertion hole 43 of the camera body 10, which achieves securement of protection against damage and weather-proof performance of the flexible board 18 with a simple structure using less number of elements.

Although the present invention has been described based on the above illustrated embodiment, the present invention is not limited solely thereto. For instance, in the above illustrated embodiment of the camera 1, the four sockets 27, to which the spherical ends 26 of the four support rods 19 are connected in a manner to allow the spherical ends 26 to only rotate about the spherical centers thereof, are provided on the movable monitor 20 side, while the four guide grooves 31, to which the spherical ends 25 of the four support rods 19 are connected in a manner to allow the spherical ends 25 to both rotate about the spherical centers thereof and move linearly; however, this positional relationship can be reversed, namely, it is possible that the four sockets 27 be provided on the camera body 10 side while the four guide grooves 31 be provided on the movable monitor 20 side.

In the above illustrated embodiment of the camera 1, the four internal guides 34, which form the four guide grooves 31, each have a substantially uniform cross sectional shape in the longitudinal direction thereof and apply friction substantially uniformly against the spherical end 25 of the associated support rod 19 throughout the length of associated guide groove 31. Conversely, it is possible to partially vary the magnitude of friction applied to each support rod 19 in the associated guide groove 31. For instance, since the efficiency of transmission of force (component: of force) for sliding the spherical ends 25 along the guide grooves 31 varies according to variations of the rising angles of the support rods 19 when the movable monitor 20 is moved as noted above, friction which acts on the spherical end 25 of each support rod 19 from the associated guide groove 31 can be determined to vary according to the variation of the transmission efficiency. In addition, it is also possible to facilitate the positioning of the movable monitor 20 by increasing friction against the spherical end 25 of each (or at least one) support rod 19 at a specific position(s) in the associated guide groove 31 in the longitudinal direction thereof. For instance, if the friction against the spherical end 25 of each support rod 19 is set larger at positions in the vicinity of the inner and outer ends of the associated guide groove 31, the holding stability of the movable monitor 20 is improved at specific positions such as the initial position of the movable monitor 20 (shown in FIGS. 1 and 20), the fully tilted (leftward/rightward/downward/upward) positions (shown in FIGS. 2 through 5) and the fully rearwardly pulled-out positions (shown in FIGS. 7, 11, 12 and 13). It is also possible, as a further modification, for the guide grooves 31 to be provided therein, at specific positions in the longitudinal direction thereof, with recesses or protrusions which click-stop and lightly lock the spherical ends 25 thereat. Such loads of the guide grooves 31 on the spherical ends 25 can be adjusted by making changes to the wall thickness and cross-sectional shape of the outer member 34d and the inner member 34e, and the cross-sectional shape of the cover member 35, etc.

The sockets 27 of the above illustrated embodiment of the camera 1 each hold the spherical end 26 of the associated support rod 19 by the pair of retaining concave surfaces 27e having spherical concave surfaces. This structure suppresses the occurrence of rattling between the spherical end 26 of each support rod 19 and the associated socket 27, makes the spherical end 26 of each support rod 19 hard to come off the associated socket 27, and is superior in both holding accuracy and strength. However, the spherical end 26 of each support rod 19 can also be held by a different holding structure from the pair of retaining concave surfaces 27e. For instance, the spherical concave surfaces such as the pair of retaining concave surfaces 27e of each socket 27 can be replaced by a pair of polygonal inner surfaces, each consisting of a group of flat surfaces, to hold the spherical end 26 of the associated support rod 19. Additionally, with portions corresponding to the sockets 27 omitted, it is also possible for the movable monitor 20 be provided with different holding members which hold the spherical ends 26 of the support rods 19 in a manner to prevent the pair of support arms 28c of each retainer 28 from moving in the mutually opposing directions thereof (the leftward and rightward directions with respect to FIG. 19) and which prevent the spherical ends 26 of the support rods 19 from moving in directions orthogonal to the aforementioned mutually opposing directions (e.g., in the upward and downward directions with respect to FIG. 19 and the direction (depthwise direction) orthogonal to the sheet of FIG. 19); the spherical end 26 of each support rod 19 can also be rotatably supported about the spherical center thereof with such a combination of a plurality of members.

Although the angle of the movable monitor 20 in the upward direction largely varies by a rotation of the support frame 22 relative to the base plate 23 in addition to a variation in angle of the movable monitor 20 which applied by using the four support rods 19 in the above illustrated embodiment of the movable monitor 20, the two-stage variations of the angle of the movable monitor 20 can also be achieved in a different tilting direction other than the upward tilting direction. In addition, it is possible to modify the camera 1 such that the movable monitor 20 can be moved with a different support mechanism for the movable monitor 20 which consists solely of the support rods 19, i.e., with omission of the structure allowing the support frame 22 to rotate relative to the base plate 23 (i.e., with the support frame 22 and the base plate 23 formed integral with each other).

In the illustrated embodiment, although the pins 22x are provided along the upper side portion 22a of the support frame 22, out of the four sides of the movable monitor 20, it is possible to alternatively provide the pins 22x along either the lower side portion 22b, the left side portion 22c or the right side portion 22d. In either such alternative, the direction in which the support frame 22 carries out the two-stage variations in angle thereof relative to the base plate 23 would be downward, leftward or rightward, respectively; and the arrangement structure for the flexible board would also change in accordance with the position of the pins 22x. Specifically, in the case where the pins 22x are provided along the lower side portion 22b, the support structure for the flexible board 18 can be configured in a manner that is vertically inverted with respect to the manner shown in the illustrated embodiment. In the case where the pins 22x are provided along the left side portion 22c or the right side portion 22d, the support structure for the flexible board 18 can be configured in a manner that is forwardly or reversibly rotated by 90° (i.e., the board accommodating recess 44 and the board guiding recess 45 are provided on the base plate 23 with respect to the leftward/rightward direction) with respect to the manner shown in the illustrated embodiment. In any of these modified embodiments, the flexible board 18 can be arranged so as not to interfere with the guide grooves 31, the sockets 27 and the support rods 19 that are arranged in diagonal directions of the rectangular shaped movable monitor 20 and monitor accommodating portion 30.

In the illustrated embodiment, the flexible board 18 is used to electrically connect the camera body 10 with the movable monitor 20, however, it is possible to employ a different manner of electrically connecting the camera body 10 with the movable monitor 20 other than using a flexible board, such as, for example, using lead wires, etc.

Although the movable monitor 20 of the above illustrated embodiment of the camera 1 is equipped with the display 21 having a horizontally-elongated (landscape-orientated) display screen 21a, the present invention can also be applied to a type of imaging apparatus equipped with a display screen having a different shape such as a square display screen. Additionally, the shape of the display screen (21a) is not limited solely to a rectangular shape and can be a triangular shape, a quadrangular shape other than a rectangular shape, a polygonal shape having more than four vertices, or a curved shape having no vertex, etc.

Instead of a type of displayer like the movable monitor 20 of the above illustrated embodiment of the camera 1, in which the display 21 is fixedly mounted on the support frame 22, a type of displayer in which a separate display (e.g., a smartphone or the like) that is provided separately from the support frame 22 is detachably attached to the support frame 22 can be adopted. Either a normal display having only a display function or a touchscreen display that the user can control an in-built processor (CPU, etc.) by touching the screen can be adopted as a display of a displayer.

The above illustrated embodiment of the camera 1 is a lens-interchangeable SLR camera; however, an imaging apparatus to which the present invention is applied is not limited to a lens-interchangeable SLR camera; the present invention can also be applied to a still camera other than a lens-interchangeable SLR camera (e.g., a compact camera) or a camcorder used mainly for recording moving images.

Since the camera angle is often changed during photographing, especially during video taking, an imaging apparatus according to the present invention that is equipped with a displayer having a high degree of flexibility in setting the position thereof is advantageously used for taking videos (filming).

As a mechanism for supporting an image displayer in a movable manner, the present invention is also applicable to the following apparatuses other than imaging apparatuses: laptop personal computers, mobile electronic apparatuses such as tablet computers and smartphones, automotive navigation systems, testers such as oscilloscopes, etc.

In addition, the present invention can be widely applied to apparatuses in various technical fields which are equipped with a movable member, for use other than image display use, which is supported to be movable relative to an apparatus body. For example, the support mechanism of the present invention can be applied to the supporting of the following movable member(s)/device(s): an operation panel of an electronic apparatus; a sideview mirror or a rearview mirror provided on a vehicle; wall-mounted equipment such as a wall clock; a writing board (whiteboard); a drafting board; a tilting table on which a laptop computer or a keyboard is supported; an antenna stay; a loudspeaker; a microphone; or a projector etc.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. An imaging apparatus comprising:
a body provided with an image sensor;
a displayer configured to display an image obtained via said image sensor, said displayer being supported by said body to be movable relative to said body;
a connecting member provided with a first connecting portion and a second connecting portion;
a first support portion provided on one of said body and said displayer, said first connecting portion of said connecting member being connected to said first support portion in a rotatable manner about a spherical center of said first connecting portion relative to said one of said body and said displayer; and
a second support portion provided on the other of said body and said displayer, said second connecting portion of said connecting member being connected to said second support portion in a rotatable manner about a spherical center of said second connecting portion and in a linearly-movable manner in a linear movement direction relative to said other of said body and said displayer, wherein
said second support portion includes a guide groove that extends in said linear movement direction, said second connecting portion being fitted into said guide groove in a manner to allow said second connecting portion to slide along an inner surface of said guide groove,
said guide groove comprises:
a base portion that extends in said linear movement direction and faces an opening of said guide groove; and
a pair of facing walls that project from side ends of the base portion and contact said second connecting portion, and
said pair of facing walls are resiliently deformable and configured to apply a friction force to the second connecting portion to control the linear movement of the second connecting portion.

2. The imaging apparatus according to claim 1, wherein a position of said displayer relative to said body varies by the rotation of said first connecting portion of said connecting member about said spherical center thereof relative to said first support portion and a combination of the rotation of said second connecting portion of said connecting member about said spherical center thereof relative to said second support portion and said linear movement of said second connecting portion of said connecting member relative to said second support portion.

3. The imaging apparatus according to claim 1, wherein said displayer is positioned on a line extended from an optical axis of a light bundle incident on said image sensor, and said connecting member, said first support portion and said second support portion are provided on portions of said body and said displayer which face each other in a direction of said extended line.

4. The imaging apparatus according to claim 3, wherein said second support portion supports said second connecting portion in a manner to allow said first connecting portion to move linearly in a plane substantially orthogonal to said optical axis.

5. The imaging apparatus according to claim 1, wherein said connecting member comprises a rod-shaped portion formed between said first connecting portion and said second connecting portion, said first connecting portion of said connecting member includes a spherical body provided at one end of said rod-shaped portion, said second connecting portion of said connecting member includes a spherical body provided at another end of said rod-shaped portion, said second connecting portion being fitted into said guide groove in a manner to allow a spherical outer surface of said second connecting portion to slide on the inner surface of said guide groove, and a projecting direction of said rod-shaped portion relative to said guide groove therefrom varies when said second connecting portion slides in said linear movement direction along said guide groove.

6. The imaging apparatus according to claim 1, wherein said pair of facing walls hold a spherical outer surface of said second connecting portion, and said second connecting portion is inserted into said guide groove with said distance made larger than that in a free state to thereby receive sliding resistance from said pair of facing walls.

7. The imaging apparatus according to claim 5, wherein said guide groove comprises a retaining member which prevents said second connecting portion from being disengaged from said guide groove in an opposite direction from said base portion, and an opening which allows said rod-shaped portion to be inserted into said guide groove through said opening is formed in said retaining member.

8. The imaging apparatus according to claim 5, wherein said first support portion comprises:
a pair of concave surfaces which hold a spherical outer surface of said first connecting portion from opposite sides thereof in a manner to allow said first connecting portion to rotate about said spherical center thereof; and a concave-surface support member which is resiliently deformable to allow a distance between said pair of concave surfaces that face each other to vary, said one of said body and said displayer, on which said first support portion is provided, includes a support member mount which supports said concave-surface support member while making said distance between said pair of concave surfaces smaller than that in a free state, and a sliding resistance is applied between said first connecting portion and said pair of concave surfaces with said concave-surface support member installed in said support member mount.

9. The imaging apparatus according to claim 1, wherein said displayer has a substantially rectangular outer shape, said guide groove includes four guide grooves, said four guide grooves being formed to extend in four directions which connect a center of said rectangular outer shape with four corners of said rectangular outer shape of said displayer, respectively, said connecting member includes four connecting members, said second connecting portion of each of said four connecting members is inserted into one of said four guide grooves, respectively; and said first support portion includes four first support portions, said first connecting portion of each of said four connecting members is connected to one of said four first support portions, respectively.

10. The imaging apparatus according to claim 9, wherein when said displayer moves in a direction to increase a distance between said displayer and said body, said second connecting portions of said four connecting members move in said four guide grooves from said four corners toward said center of said rectangular outer shape, respectively, and when said displayer moves in a direction to decrease said distance between said displayer and said body, said second connecting portions of said four connecting members move in said four guide grooves from said center of said rectangular outer shape toward said four corners, respectively.

11. The imaging apparatus according to claim 1, wherein said displayer comprises:
a first support stage which is connected to said body via said connecting member; and
a second support stage configured to tilt in at least one direction relative to said first support stage via a tilt mechanism provided independently of said connecting member.

12. The imaging apparatus according to claim 1, wherein said second support portion is provided on said body, and wherein said first support portion is provided on said displayer.

13. The imaging apparatus according to claim 12, wherein said displayer comprises:
a display screen;
a base plate which supports said first support portion; and
a support frame which supports said display screen, wherein
said body includes an accommodating portion, having a recessed shape, which can accommodate said displayer, said second support portion being provided in said accommodating portion, and
said base plate includes a cutout which allows said second support portion to enter therein when said displayer is accommodated in said accommodating portion.

14. The imaging apparatus according to claim 1, wherein
said imaging apparatus is further provided with a connector which is configured to electrically connect a body control circuit of said body to a displayer control circuit of said displayer, and
said connector is provided between said body and said displayer and has a length that allows said displayer to move relative to said body.

15. The imaging apparatus according to claim 14, wherein said imaging apparatus is further provided with a liquid-tight cover that covers at least a part of said connector.

16. An imaging apparatus comprising:
a body provided with an image sensor;
a displayer configured to display an image obtained via said image sensor, said displayer being supported by said body to be movable relative to said body;
a connecting member provided with a first connecting portion and a second connecting portion;
a first support portion provided on one of said body and said displayer, said first support portion connecting to said first connecting portion of said connecting member to be movable with respect to said first connecting portion; and
a second support portion provided on the other of said body and said displayer, said second support portion connecting to said second connecting portion of said connecting member to be movable with respect to said second connecting portion, wherein
a connecting configuration of said first support portion for connecting with said first connecting portion and a connecting configuration of said second support portion for connecting with said second connecting portion are mutually different,
said second support portion includes a guide groove that extends in a linear movement direction, said second connecting portion being fitted into said guide groove in a manner to allow said second connecting portion to slide along an inner surface of said guide groove,
said guide groove comprises:
a base portion that extends in said linear movement direction and faces an opening of said guide groove; and
a pair of facing walls that project from side ends of the base portion and contact said second connecting portion, and
said pair of facing walls are resiliently deformable and configured to apply a friction force to the second connecting portion to control the linear movement of the second connecting portion.

17. The imaging apparatus according to claim 16, wherein said displayer is configured to tilt in a plurality of directions relative to said body.

18. A support mechanism which supports a movable member in a manner to allow said movable member to move relative to a body, said support mechanism comprising:
a connecting member provided with a first connecting portion and a second connecting portion;
a first support portion provided on one of said body and said movable member, said first connecting portion of said connecting member being connected to said first support portion in a rotatable manner about a spherical center of said first connecting portion relative to said one of said body and said movable member; and
a second support portion provided on the other of said body and said movable member, said second connecting portion of said connecting member being connected to said second support portion in a rotatable manner about a spherical center of said second connecting portion and in a linearly-movable manner in a linear movement direction relative to said other of said body and said movable member, wherein
said second support portion includes a guide groove that extends in said linear movement direction, said second connecting portion being fitted into said guide groove in a manner to allow said second connecting portion to slide along an inner surface of said guide groove,
said guide groove comprises:
a base portion that extends in said linear movement direction and faces an opening of said guide groove; and
a pair of facing walls that project from side ends of the base portion and contact said second connecting portion, and
said pair of facing walls are resiliently deformable and configured to apply a friction force to the second connecting portion to control the linear movement of the second connecting portion.

19. The support mechanism according to claim 18, wherein said movable member comprises:
a first support stage which is connected to said body via said connecting member; and
a second support stage configured to tilt in at least one direction relative to said first support stage via a tilt mechanism provided independently of said connecting member.

20. The support mechanism according to claim 18, wherein
said movable member comprises a display capable of displaying images.

* * * * *